United States Patent [19]
Nakanishi

[11] Patent Number: 5,878,121
[45] Date of Patent: *Mar. 2, 1999

[54] METHOD AND SYSTEM FOR SELECTING AND TRANSMITTING OPTIMUM ROUTE

[75] Inventor: Takayuki Nakanishi, Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 495,950

[22] Filed: Jun. 28, 1995

[30] Foreign Application Priority Data

Jun. 30, 1994 [JP] Japan .................................. 6-150282
Jun. 9, 1995 [JP] Japan .................................. 7-142824

[51] Int. Cl.$^6$ .................................................. H04M 15/00
[52] U.S. Cl. ...................... 379/115; 379/221; 379/225; 379/112
[58] Field of Search ..................... 379/112, 114, 379/115, 119, 121, 130, 131, 140, 201, 225, 229, 221

[56] References Cited

U.S. PATENT DOCUMENTS

| | | | |
|---|---|---|---|
| 4,594,477 | 6/1986 | Noirot | 379/225 |
| 5,400,395 | 3/1995 | Berenato | 379/114 |
| 5,420,914 | 5/1995 | Blumhardt | 379/114 |
| 5,473,630 | 12/1995 | Penzias et al. | 379/115 |
| 5,553,124 | 9/1996 | Brinskele | 379/114 |

*Primary Examiner*—Paul Loomis
*Attorney, Agent, or Firm*—Helfgott & Karas, PC.

[57] ABSTRACT

A line whose toll is the lowest is calculated directly out of lines existing in each position within a private network on the basis of a telephone call toll data of each station so that trunks of all stations can be accessed through a local station trunk or a trunk line. Namely, the telephone call toll data is stored in each exchange and a central exchange within the private network or in a main storage unit within an external calculator of each station so that the data can be transmitted from the line whose toll is the lowest.

22 Claims, 30 Drawing Sheets

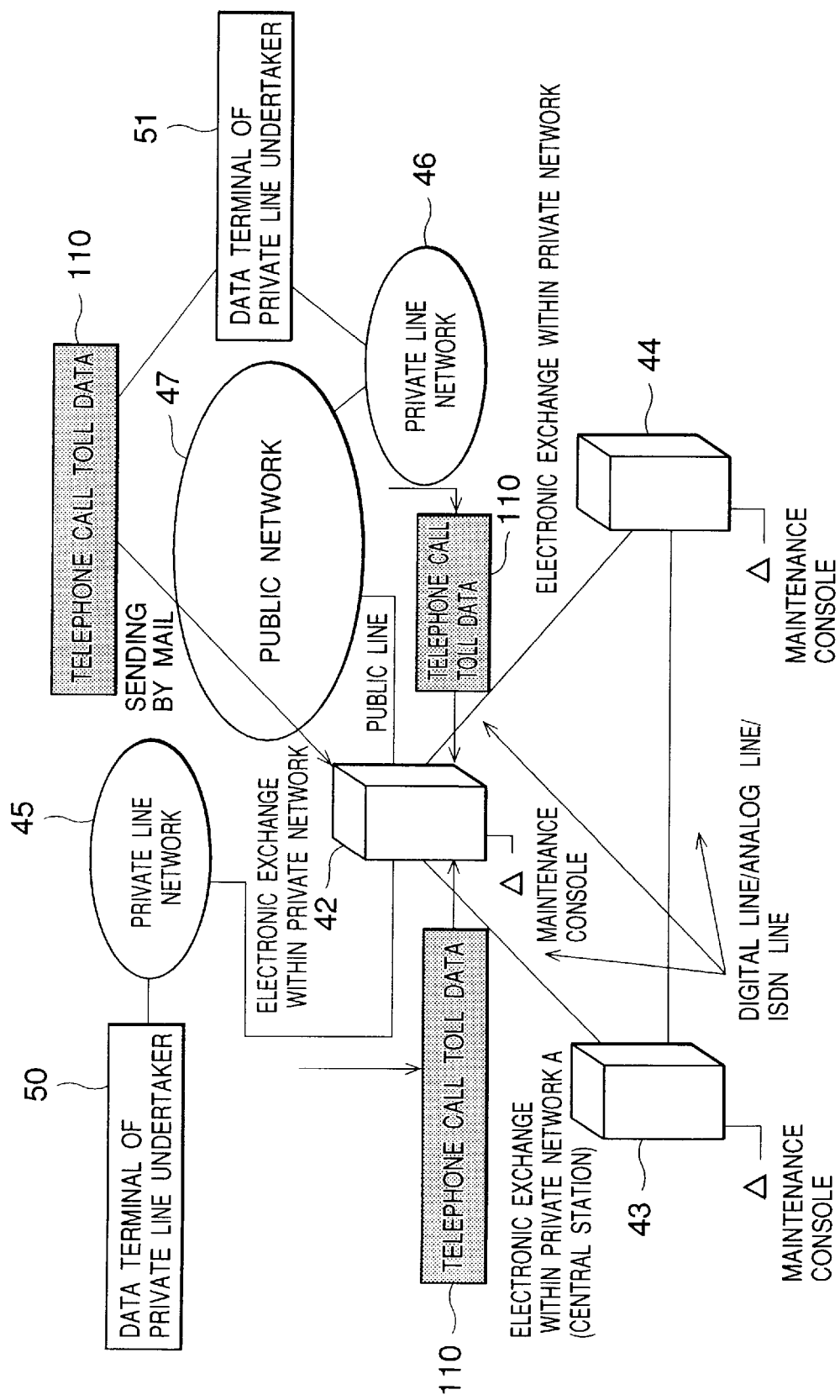

F I G. 2 8
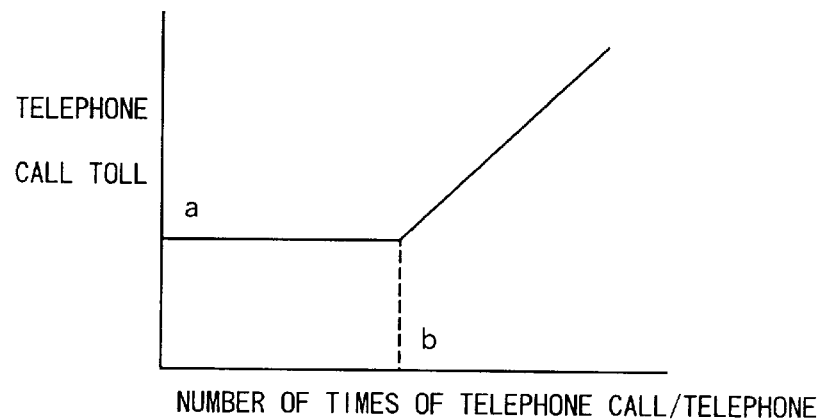
F I G. 2 9
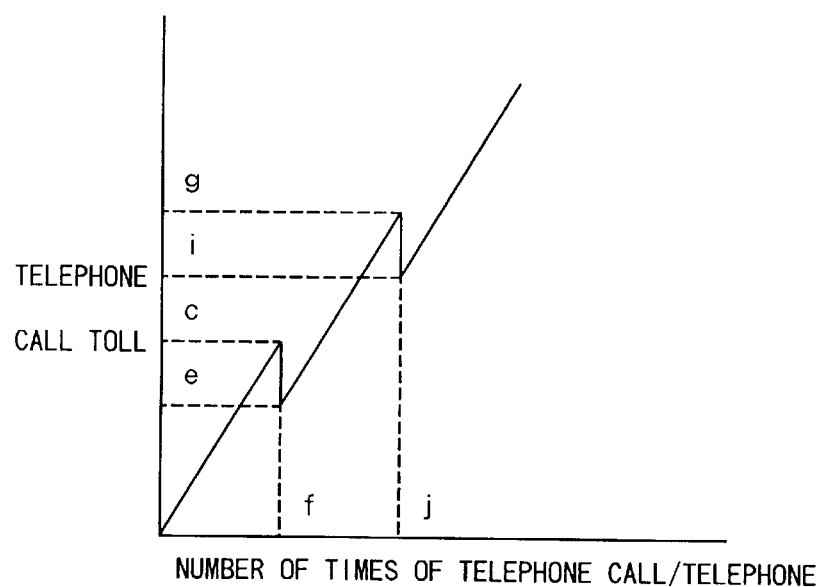

F I G. 30

TABLE 1

200 — AVAILABLE LINES FROM TELEPHONE STATION
(REFERRED TO AS FIRST STATION FOR SHORT)

| A LINE RELATIONAL DATA | B LINE RELATIONAL DATA | C LINE RELATIONAL DATA | ... |

201 — AVAILABLE LINES FROM TELEPHONE STATION
(REFERRED TO AS SECOND STATION FOR SHORT)

| D LINE RELATIONAL DATA | E LINE RELATIONAL DATA | F LINE RELATIONAL DATA | ... |

202 — AVAILABLE LINES FROM TELEPHONE STATION
(REFERRED TO AS THIRD STATION FOR SHORT)

| G LINE RELATIONAL DATA | H LINE RELATIONAL DATA | I LINE RELATIONAL DATA | ... |

...

F I G. 3 1

TABLE 2

| | | |
|---|---|---|
| 203 ⟩ | INITIAL TELEPHONE CALL TOLL $A_1$ (PER, E.G., $A_1$ MIN.) | $A_1$ YEN IS (PUBLIC LINES ZONE A TOLL<br>$A_1$ YEN + PRIVATE LINES ZONE B TOLL<br>$B_1$ YEN + PUBLIC LINES ZONE C TOLL<br>$C_1$ YEN, AND TOTAL PUBLIC LINES ZONE D TOLL) |
| 204 ⟩ | ADDITIONAL TOLL $A_2$ (PER, E.G., $A_2$ SEC.) | $A_2$ YEN IS (PUBLIC LINES ZONE A TOLL<br>$A_2$ YEN + PRIVATE LINES ZONE B TOLL<br>$B_2$ YEN + PUBLIC LINES ZONE C TOLL<br>$C_2$ YEN, AND TOTAL PUBLIC ZONE D TOLL) |

FIG. 32

TABLE 3

| | $l_1$ MIN. UNDER | $l_1$ MIN. OVER AND $l_2$ MIN. WITHIN LIMITS | $l_2$ MIN. OVER AND $l_3$ MIN. WITHIN LIMITS | $l_3$ MIN. OVER |
|---|---|---|---|---|
| TOTAL TELEPHONE CALL TOLL (MULTIPLYING INITIAL TELEPHONE CALL TOLL BY INTEGER OF ADDITIONAL TOLL ADDED PER SECOND) | $L_1$ YEN | $L_2$ YEN | $L_3$ YEN | $L_4$ YEN |

TABLE 4

206 — TOLL DATA FOR CORRESPONDING DESTINATION OF PUBLIC LINE A ZONE
- INITIAL TELEPHONE CALL TOLL $A_1$ YEN
- PER $A_1$ MIN
- ADDITIONAL TOLL $A_2$
- PER $A_2$ SECOND

207 — TOLL DATA FOR CORRESPONDING DESTINATION OF PRIVATE LINE B ZONE
- INITIAL TELEPHONE CALL TOLL $B_1$ YEN
- PER $B_1$ MIN
- ADDITIONAL TOLL $B_2$
- PER $B_2$ SECOND

208 — TOLL DATA FOR CORRESPONDING DESTINATION OF PRIVATE LINE C ZONE
- INITIAL TELEPHONE CALL TOLL
- PER $C_1$ MIN
- ADDITIONAL CHARGE $C_2$
- PER $C_2$ SECOND

FIG. 34

TABLE 5

| | | |
|---|---|---|
| $\alpha$ TERM | IN CASE THAT T SECOND $> a_1 \times 60$: $A_1 + \left( \left[ \dfrac{t - a_1 \times 60}{a_2} \right] + 1 \right) \times A_2$ | IN CASE THAT T SECOND $=< a_1 \times 60$: $A_1$ YEN |
| $\beta$ TERM | IN CASE THAT T SECOND $> b_1 \times 60$: $B_1 + \left( \left[ \dfrac{t - b_1 \times 60}{b_2} \right] + 1 \right) \times B_2$ | IN CASE THAT T SECOND $=< b_1 \times 60$: $B_1$ YEN |
| $\gamma$ TERM | IN CASE THAT T SECOND $> c_1 \times 60$: $C_1 + \left( \left[ \dfrac{t - c_1 \times 60}{c_2} \right] + 1 \right) \times C_2$ | IN CASE THAT T SECOND $=< c_1 \times 60$: $C_1$ YEN |

FIG. 35

TABLE 6

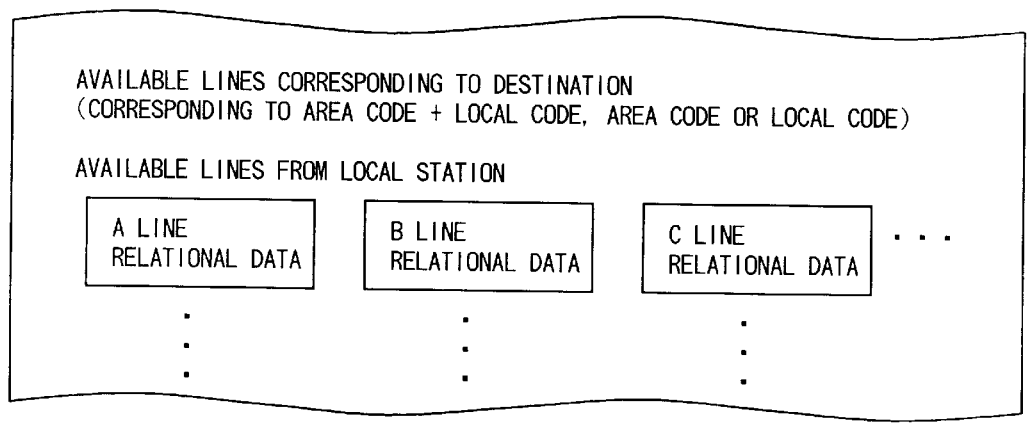

FIG. 36

TABLE 7

| COMBINATION 1 | | | |
|---|---|---|---|
| LINE a | TOTAL TELEPHONE CALL TOLL | TOTAL TELEPHONE CALL SETTING TIME | TOTAL TELEPHONE CALL TIME |
| LINE b | TOTAL TELEPHONE CALL TOLL | TOTAL TELEPHONE CALL SETTING TIME | TOTAL TELEPHONE CALL TIME |
| . | . | . | . |
| . | . | . | . |
| . | . | . | . |
| LINE $N_1$ | TOTAL TELEPHONE CALL TOLL | TOTAL TELEPHONE CALL SETTING TIME | TOTAL TELEPHONE CALL TIME |
| COMBINATION 2 | | | |
| LINE a | TOTAL TELEPHONE CALL TOLL | TOTAL TELEPHONE CALL SETTING TIME | TOTAL TELEPHONE CALL TIME |
| LINE b | TOTAL TELEPHONE CALL TOLL | TOTAL TELEPHONE CALL SETTING TIME | TOTAL TELEPHONE CALL TIME |
| . | . | . | . |
| . | . | . | . |
| . | . | . | . |
| LINE $N_2$ | TOTAL TELEPHONE CALL TOLL | TOTAL TELEPHONE CALL SETTING TIME | TOTAL TELEPHONE CALL TIME |
| COMBINATION X | | | |
| LINE a | TOTAL TELEPHONE CALL TOLL | TOTAL TELEPHONE CALL SETTING TIME | TOTAL TELEPHONE CALL TIME |
| LINE b | TOTAL TELEPHONE CALL TOLL | TOTAL TELEPHONE CALL SETTING TIME | TOTAL TELEPHONE CALL TIME |
| . | . | . | . |
| . | . | . | . |
| . | . | . | . |
| LINE $N_X$ | TOTAL TELEPHONE CALL TOLL | TOTAL TELEPHONE CALL SETTING TIME | TOTAL TELEPHONE CALL TIME |

FIG. 37

TABLE 8

| HEAD TABLE NUMBER | |
|---|---|
| LAST TABLE NUMBER | |
| TABLE NUMBER 0 | EXTENSION CABLE CALL |
| COMBINATION NUMBER | |
| LINE NUMBER OF MINIMUM POSSIBLE TELEPHONE CALL TOLL | |
| . | |
| COMBINATION NUMBER | |
| LINE NUMBER OF MINIMUM POSSIBLE TELEPHONE CALL TOLL | |
| NEXT TABLE NUMBER | |
| TABLE NUMBER 1 | EXTENSION CABLE CALL |
| COMBINATION NUMBER | |
| LINE NUMBER OF MINIMUM POSSIBLE TELEPHONE CALL TOLL | |
| . | |
| COMBINATION NUMBER | |
| LINE NUMBER OF MINIMUM POSSIBLE TELEPHONE CALL TOLL | |
| NEXT TABLE NUMBER | |

| TABLE NUMBER X | EXTENSION CABLE CALL |
|---|---|
| COMBINATION NUMBER | |
| LINE NUMBER OF MINIMUM POSSIBLE TELEPHONE CALL TOLL | |
| COMBINATION NUMBER | |
| LINE NUMBER OF MINIMUM POSSIBLE TELEPHONE CALL TOLL | |
| . | |
| COMBINATION NUMBER | |
| LINE NUMBER OF MINIMUM POSSIBLE TELEPHONE CALL TOLL | |
| NEXT TABLE NUMBER (FREE = FINISH TABLE) | |

F I G. 3 8

TABLE 9

| EXTENSION CLASS | UPPER LIMITS CLASS | LOWER LIMITS CLASS | | THE CIRCUIT (La) | THE CIRCUIT QUALITY CLASS |
|---|---|---|---|---|---|
| 1 | (1) | (3) | | a | (1) |
| 2 | (1) | (5) | | b | (5) |
| 3 | (1) | (7) | | c | (1) |
| ... | ... | | | ... | ... |
| x | (1) | (7) | | x | (1) |

METHOD AND SYSTEM FOR SELECTING AND TRANSMITTING OPTIMUM ROUTE

BACKGROUND OF THE INVENTION

1. Field of invention

The present invention relates to a method and a system for selecting and transmitting an optimum route, and particularly a method and a system for selecting and transmitting an optimum route which bypasses a line of the minimum toll on the basis of telephone call toll data.

2. Description of the Related Art

In recent years, a rate of dependence upon an optimum route selection LCR (Least Cost Routing)[ARS (Automatic Route Selection)]/AAR (Automatic Alternate Routing) service by a private electronic exchange network and a private communication line provider in a station line transmission and a trunk line transmission has been increased with a development of communication network and an increase of communication quantity and communication cost and so on.

An accurate LCR/AAR route selection unit has been demanded for reducing more expenses as the rate of dependence upon the services is increased.

A selection unit for selecting an automatic route/bypass and a station line transmission unit for executing a transmission on the basis of the selection are provided with the LCR/AAR route selection unit.

In a private network of an electronic exchange provided with the above-mentioned LCR/AAR route selection unit, a selective transmission has been executed in order that the line was defined like the next second line, the third line and so on, when a use order of an available line of a corresponding destination, for instance, the first line could not be used since the line was busy.

On the other hand, in an enterprise using a private network of the above-mentioned electronic exchange, a selection of a line on the basis of a correct telephone call toll data for each route/line in each position of exchange installation and an update of the telephone call toll on the basis of the latest telephone call toll data in each position have been demanded.

Besides, it has been demanded that the toll is compared in a line used by a user of the exchange and the available line, and a line to be subscribed newly and a line to be cancelled are determined correctly, as the communication network used by the user is diversified.

Further, it also has been demanded that a frame of the line which can be selected is reduced and a quality of telephone call is improved according to a degree of demand of quality for the line of a transmitter, when a difference exists in the quality of the line to be selected.

In a private network using the LCR (ARS/AAR) transmission unit, a bypass unit for comparing the toll on the basis of the telephone line toll data when each position is regarded as a transmission position for the destination to be transmitted, and bypassing the position within the private network which will be the minimum toll also has been demanded due to the above-mentioned circumstances.

Besides, it also has been demanded that the bypass unit is provided with a storage unit for storing a telephone call data of local station so as to maintain the telephone call toll data of the local station and an inquiry unit for inquiring the telephone call toll through a data line for each position so as to select an optimum line for every transmission.

Further, it also has been demanded that the bypass unit is provided with means which is capable of transmitting and receiving the telephone call toll data within the local station through the data line in an arbitrary transmitting position, and updating the latest data anytime, when the telephone call toll data is provided for every transmitting position.

Moreover, it also has been demanded that the bypass unit is provided with a comparison unit for comparing the telephone call toll similarly for all of the available lines every time the transmission is executed so as to determine the line to be subscribed newly and the line to be canecelled correctly.

This has been demanded for making it possible to sum up the telephone call toll in a short period of time, for instance, by summing up the virtual telephone call toll for the line which is supposed to be the minimum telephone call toll if it is subscribed when the transmission is executed from the existing line, with the telephone call toll according to the existing line corresponding to the telephone call.

On the other hand, also in a common household telephone, the telephone call toll can be compared and it will be possible to execute a line subscription contract for reducing the telephone use toll, if the household telephone is capable of calculating a virtual telephone call toll.

Further, to put it more concretely, the 93342 number Official Report of Patent Disclosure in 1991 exists as an example of a system to which the route selection process described hereinbefore is adopted. The 290093 number Official Report of Patent Disclosure in 1987 exists as an example of a system for selecting an arbitrary relay network from a public telephone to talk over the telephone. Besides, the 136596 number Official Report of Patent Disclosure in 1991 exists as an example of a method for selecting an optimum telephone call toll line.

In the system disclosed in the 93342 number Official Report of Patent Disclosure in 1991, it is judged whether or not a subscriber number provided for every subscriber conforms with a dialed number.

A public network subscriber number is converted into a private network subscriber number, when the subscriber number conforms with the dialed number.

At this moment, a telephone call in which a private exchange subscriber number is transmitted to a private exchange to bypass the private exchange can be executed, since a line of a trunk line is acquired.

On the other hand, a nonnumerical dial figure is transmitted to the public network after acquiring the line of the relay line, when the subscriber number does not conform with the dialed number. At this moment, the telephone call bypassing the public network is executed.

For this reason, in the system disclosed in the 93342 number Official Report of Patent Disclosure in 1991, it is possible to provide a route selection processing system in a communication system in which both of the public network and the private network can be used by judging whether or not the subscriber number conforms with the dialed number.

Besides, a database in which toll data according to route of a telecommunications undertaker connected to the private exchange network is stored is provided for the system disclosed in the 136596 number Official Report of Patent Disclosure in 1991.

Each of the exchanges is capable of inquiring of the database about a telephone number of the telecommunications undertaker whose telephone call toll will be the lowest, acquiring the most inexpensive telecommunications undertaker number from the database and adding the number to the dial number to execute a transmission, for instance, when the transmission is executed outside of the private exchange network.

Namely, in the system, a demand for retrieving the telecommunications undertaker number of the minimum telephone call toll transmitted from the exchange is received with the data of the dial number through a communication control unit.

At this moment, in the control unit within the exchange, the telephone call toll data according to route of each undertaker concerning a transmission area is retrieved from a memory table in which a transmitter number of a receiving data is set as a key for every transmission area.

However, in the conventional system described hereinbefore, the problems listed hereinafter could not be solved.

(1) Time and cost mount up to a large sum.

Namely, a correct comparison based on the telephone call toll data concerning the available lines was not always executed from each position within the private network, even if the data concerning the selection order of the above-mentioned lines was inputted, when a public line transmission through a private line was allowed, and the comparison was often executed in accordance with an exchange user's subjective and improper judgment.

(2) Communication cost exceeds the minimum communication cost which is realizable essentially.

For instance, when the data concerning the line and selection order are prepared reflecting the latest telephone call toll data, it will take a lot of time and cost to prepare these data.

Further, in the related art, the data for judging the lines to be subscribed and the lines to be cancelled were not stored previously in storage means, and means which makes it possible to sum up securely the data for reducing the communication cost according to line by using a traffic information of the exchange itself and network maintenance and an accounting information did not exist.

Accordingly, in the above-mentioned related art, there is the possibility that the communication cost exceeds the minimum communication cost which is realizable essentially, since the line selection is not executed on the basis of the data for judging the lines to be subscribed and the lines to be cancelled, the traffic information of the exchange itself and network maintenance, the accounting information and so on.

(3) It was impossible to update and sum up the latest telephone call toll data in a short period of time.

Besides, in the related art, it was impossible to update and use the telephone call toll data on the basis of the latest telephone call toll data in a short period of time.

(4) It is impossible to determine the subscription line in which the telephone call toll can be the lowest.

Further, in the related art, it was impossible to determine the subscription line in which the telephone call toll could be the lowest from the latest line use circumstances.

SUMMARY OF THE INVENTION

An object of the present invention is to compare a toll of each line for telephone call to a destination when a station line is transmitted, on the basis of a telephone call toll data of lines which can be used by each position within a private network, and provide a transmission unit for transmitting the station line automatically through a relay station to the line of the minimum toll.

Besides, another object of the present invention is to provide a transmitting /receiving unit for transmitting and receiving automatically a telephone call toll data of available lines concerning each position used by each exchange through a data line and so on.

Further, another object of the present invention is to calculate a possible telephone call toll concerning noncontracted lines which can be used by each position with the total telephone call toll per month concerning the lines which are used at present by each position within a private network, and provide raw materials for judging the optimum line contract.

On the other hand, another object of the present invention is to calculate a call allocation rate for the optimum each subscription line in response to the possible telephone call toll per month so that the lowest telephone call toll per month can be realized.

Claims between 1 and 12 are concerned with processing methods, and it is possible to combine the processing methods at will to process within the limits of Claims between 1 and 12. Besides, Claims between 13 and 24 are concerned with a system, and it is possible to construct a plurality of systems by combining the constructions from Claim 13 to Claim 24.

The first aspect of the present invention is a private network system provided with selection means for selecting an optimum route in a station line transmission of each electronic exchange and selection means for selecting an optimum line in a trunk line transmission among the electronic exchanges, comprising the steps of:

using a telephone call toll data of public network including a line network provided by a undertaker who provides private telephone lines of every kind in an installation position of each electronic exchange;

selecting the optimum route or line by the optimum route selection means or optimum line selection means for selecting an optimum route or a line from the private network on the basis of the telephone call toll data of the public network; and executing the transmissions selectively through the route or line selected by the selection step.

Besides, the above-mentioned method can include a step for receiving the telephone call toll data of the public network in the selection of the optimum route through the line from a central exchange of a exchange installation position of each station on which the electronic exchange is installed or a plurality of electronic exchanges.

Further, the method can comprise a step for comparing the toll of each route of the combinations, when a user of the electronic exchange executes a station line transmission through the electronic exchange that will be a local station or a relay station by combining routes which can be contracted, a step for determining the optimum route or the line of the combinations in accordance with the toll comparison step and a step for calculating a virtual toll for every combination of the lines which can be contracted in accordance with the determined result.

Besides, the method can comprise a step for collecting quality information of each of the routes or lines, a step for determining a line group which was classified on the basis of the collected quality information according to a subscriber class of a person who transmits and a step for selecting the route or a bypass of the optimum line from the determined line group.

On the other hand, the second aspect of the present invention can comprise a step for actuating the exchange by a selection actuation command outputted from a calculator outside of the exchange and a step for selecting and transmitting a route or a line when a station line is transmitted from the private network.

Besides, the method can comprise a step for transmitting and receiving the telephone call toll data of the public network necessary for actuating the exchange among the calculators outside of the exchange of each station and a step for calculating a possible telephone call toll before talking over the telephone to select an optimum route or a line.

Besides, the first aspect or the second aspect of the present invention can comprise a step for transmitting and receiving a telephone call toll data of the public network necessary for actuating the each exchange among the exchanges of each station or among the calculators outside of the exchange periodically and a step for updating the telephone call toll data within the exchange of the local station or within the calculator outside of the exchange on the basis of the transmitted and received telephone call toll data.

On the other hand, the third aspect of the present invention comprises a step for comparing the toll of each route of the combinations in transmission of the station line by combining the lines which can be contracted to determine the optimum route of the each combination within a household telephone by operation and a step for calculating a virtual toll for every combination of the lines which can be contracted within the household telephone by operation in accordance with the result determined in the route determination step.

The above-mentioned aspects from the first to the third can comprise a step for predicting a possible telephone call quantity of each route of one month according to destination by the past use information of the each route, a step for reallocating the telephone call quantity according to route and according to destination so that the total telephone call toll will be the lowest and a step for selecting a route or a line in accordance with the reallocated telephone call quantity.

Besides, the aspects from the first to the third can include a step for reallocating the possible telephone call quantity according to route or according to destination so that the total telephone call toll of one month will be the lowest, even if a route having a rate system in which the fixed telephone call toll is imposed up to a certain telephone call toll/a number of times of telephone call and the telephone call toll is raised when the telephone call time/the number of times of telephone call are surpassed is included.

Further, the aspects from the first to the third can include a step for reallocating the possible telephone call quantity according to route and according to destination so that the total telephone call toll will be the lowest, even if a route having a rate system in which the telephone call toll is raised at a fixed discount rate up to the fixed telephone call time/the number of times of telephone call and the discount rate is changed when the predetermined telephone call time/ the number of times of telephone call are surpassed is included.

Besides, the aspects from the first to the third can comprise a step for determining a ranking of the optimum routes every fixed period from the telephone call toll data of the public network to store the information and a step for selecting the optimum route from a void optimum line on the basis of the ranking information to transmit the public network.

Further, in a private network system provided with selection means for selecting an optimum route in a station line transmission of each electronic exchange and selection means for selecting an optimum line in a trunk line transmission among the electronic exchanges, the first aspect of the present invention can comprise optimum route selection means and optimum line selection means for selecting an optimum route and a line from a private network on the basis of a telephone call toll data of a public network including a line network provided by a undertaker who provides a private telephone line of every kind in an installation position of each electronic exchange and transmission means for executing a transmission by switching selectively to the optimum route or the optimum line selected by the optimum route selection means and the optimum line selection means.

Further, hereupon, the optimum route selection means, the optimum line selection means and the transmission means are actuated by a command of a central control unit installed inside of the electronic exchange or outside of the electronic exchange.

Besides, the system can include receiving means for receiving the telephone call toll data of the public network in the selection of the optimum route through the line from a central exchange of an exchange installation position of each station on which the electronic exchange is installed or a plurality of electronic exchanges.

Further, the system can comprise toll comparison means for comparing the toll of each route within the combinations, when a user of the electronic exchange transmits the station line thorough the electronic exchange which will be a local station or a relay station by the combination of the routes which can be contracted, determination means for determining an optimum route or an optimum line from the result of the comparison of the toll by the toll comparison means and virtual toll calculation means for calculating a virtual toll for every combination of the lines which can be contracted in accordance with the determination result by the determination means.

Further, the toll comparison means, the determination means and the virtual toll calculation means are actuated by a command of a central control unit installed inside of the electronic exchange or outside of the electronic exchange.

Besides, the system can comprise quality information collecting means for collecting quality information of the each route or the line, line group determination means for determining a line group which was classified according to a subscriber class of a transmitter on the basis of the quality information of the each route or the line collected in the quality information collecting means and specific line group selection means for selecting a route or a bypass for the optimum line out of the line group determined in the line group determination means.

Further, the quality information collecting means, the line group determination means and the specific line group selection means are actuated by a command of a central control unit installed inside of the electronic exchange or outside of the electronic exchange.

On the other hand, the second aspect of the present invention can include selection transmitting means for actuating the exchange by the selection actuation command outputted from the calculator outside of the exchange to select and transmit a route or a line when the station line is transmitted from the private network.

Further, the system can comprise transmitting/receiving means for transmitting and receiving the telephone call toll data of the public network necessary for actuating the each exchange among the calculators outside of the exchanges of each station, and possible telephone call toll calculation/line selection means for calculating a possible telephone call toll before talking over the telephone on the basis of the telephone call toll data received in the transmitting/receiving means to select an optimum route or an optimum line.

Further, the transmitting/receiving means and the possible telephone call toll calculation/line selection means are actuated by a command of a central control unit installed inside of the electronic exchange or outside of the electronic exchange.

Moreover, the aspects from the first to the third can comprise transmitting/receiving means for transmitting and receiving the telephone call toll data of the public network necessary for actuating the each exchange among the exchanges of the each station or among the calculators outside of the exchanges periodically, and update means for updating the telephone call toll data within the exchange of the local station or within the calculator outside of the exchange on the basis of the telephone call toll data which was transmitted and received in the transmitting/receiving means.

Further, the update means is actuated by a command of a central control unit installed inside of the electronic exchange or outside of the electronic exchange.

Besides, the system in the third aspect of the present invention can comprise comparison/determination means for comparing the toll of each route of the combinations in transmission of the station line by the combination of the lines which can be contracted to determine the optimum route of the each combination within the household telephone by operation, and virtual toll calculation means for calculating a virtual toll for every combination of the lines which can be contracted within the household telephone by operation in accordance with the result determined in the comparison/determination means.

Further, the comparison/determination means and the virtual toll calculation means are actuated by a command of a central control unit installed inside of the household telephone or outside of the household telephone.

Besides, the system in the aspects from the first to the third of the present invention can comprise possible telephone call quantity guessing means for guessing a possible telephone call quantity of one month according to each route or according to destination from the past use information of the each route, allocation means for allocating the possible telephone call quantity guessed in the possible telephone call quantity guessing means according to the route and according to the destination so that the total telephone call toll of one month will be the lowest, and selection means for selecting a route or a line in accordance with the telephone call quantity allocated in the allocation means.

Further, the possible telephone call quantity guessing means, the allocation means and the selection means are actuated by a command of a central control unit installed inside of the electronic exchange or outside of the electronic exchange.

Besides, the system in the aspects from the first to the third can include first possible telephone call quantity reallocation means for reallocating the possible telephone call quantity according to the route and according to the destination so that the total telephone call toll of one month will be the lowest, even if the rate system includes a route having a rate system in which a telephone call toll is imposed until the telephone call toll/the number of times of telephone call reaches one fixed telephone call toll and the telephone call toll is raised when the telephone call time/the number of times of telephone call are surpassed.

Further, the first possible telephone call quantity reallocation means is actuated by a command of a central control unit installed inside of the electronic exchange or outside of the electronic exchange.

Moreover, the system in the aspects from the first to the third can include the second possible telephone call quantity reallocation means in which the possible telephone call quantity is reallocated according to route and according to destination so that the total telephone call toll of one month will be the lowest, even if a route having a rate system in which the telephone call toll is raised at a fixed discount rate up to the fixed telephone call toll/the number of times of telephone call and the discount rate is changed for the second time when the telephone call time/the number of times of telephone call are surpassed is included.

Further, the second possible telephone call quantity reallocation means is actuated by a command of a central control unit installed inside of the electronic exchange or outside of the electronic exchange.

Besides, the system in the aspects from the first to the third can comprise determination/storage means for determining the ranking of the optimum route from the telephone call toll data of the public network per fixed period to store the information, and optimum route transmission means for selecting the optimum route from the optimum line on the basis of the ranking information of the optimum route which was determined and stored in the determination/storage means to transmit the public network.

Further, the determination/storage means and the optimum route transmission means are actuated by a command of a central control unit installed inside of the electronic exchange or outside of the electronic exchange.

Claims between 1 to 12 are concerned with processing methods and it is possible to obtain a plurality of interactions by combining the processing methods within the limits of Claims between 1 to 12 at will to process. Besides, Claims from 13 to 24 are concerned with a system and it is possible to obtain a plurality of interactions by combining the constructions of Claims from 13 to 24.

Namely, in the method and system for selecting and transmitting an optimum route according to the present invention, the process is executed by a step for using a telephone call data of public network including a line network provided by a undertaker who provides private telephone lines of every kind in a installation position of each electronic exchange, a step for selecting the optimum route or line by said optimum route selection means or optimum line selection means for selecting an optimum route or a line from the private network on the basis of the telephone call toll data of the public network and a step for executing the transmissions selectively through the route or line selected by the selection step, in a private network system provided with selection means for selecting the optimum route in a station line transmission of each electronic exchange and selection means for selecting the optimum line in a trunk line transmission among the electronic exchanges.

In Claim 1, for instance, as shown in FIG. 1 and FIG. 2, each of the electronic exchanges 30, 31 and 32 is connected by communication networks 100 and 102, and it is possible to transmit a station line selectively from the optimum route, when the station line is transmitted from the private network 33 by using simultaneously the telephone call toll data 100 of the public network 47 including the line network provided by the undertaker who provides the private telephone lines of every kind in the installation position of each electronic exchange.

Besides, in Claim 2, it is possible to make the process ideal by executing the process with the step for receiving the telephone call toll data of the public network in the selection of the optimum route through the line from a central exchange of an exchange installation position of each station on which the electronic exchange is installed or a plurality of electronic exchanges.

In the Claim 2, for instance, as shown in FIG. 1 and FIG. 2, it is possible to process with the step for receiving the telephone call toll data 110 of the public network 47 when the optimum line is selected in the transmission through the lines 100 and 101 from the exchange installation position of each station A, B and C or the central exchange 30.

Further, in Claim 3, it is possible to calculate a virtual toll by executing the process with a step for comparing the toll of each route of the combinations, when a user of the electronic exchange executes an station line transmission through the electronic exchange that will be a local station or a relay station by combining routes which can be contracted, a step for determining the optimum route or the line of the combinations in accordance with the toll comparison step and a step for calculating a virtual toll for every combination of the lines which can be contracted in accordance with the determined result.

For instance, as shown in FIG. 1 and FIG. 2, it is possible to compare the toll of each route of the combinations when the station line is transmitted from the local station A or through the trunk line in reference to the lines used by the user of the exchanges 30, 31 and 32 and the lines which can be used in corresponding areas, and calculate the virtual toll for every combination of the lines which can be contracted in accordance with the comparison result.

In Claim 4, it is possible to select a route or a bypass of the optimum line by executing the process with a step for collecting quality information of each of the routes or lines, a step for determining a line group which was classified on the basis of the collected quality information corresponding to a subscriber class of a transmitter and a step for selecting the route or the bypass of the optimum line from the determined line group.

In Claim 5, it is possible to execute a selection/transmission process of the line with a step for selecting and actuating the exchange by a selection actuation command outputted from a calculator outside of the exchange and a step for transmitting from the selected route or the line when a station line is transmitted from the private network.

In Claim 6, it is possible to execute the process with a step for transmitting and receiving the telephone call toll data of the public network necessary for actuating the exchange among the calculators outside of the exchange of each station and a step for calculating a possible telephone call toll before talking over the telephone to select an optimum route or a line.

In Claim 7, it is possible to update a telephone call toll data with a step for transmitting and receiving a telephone call toll data of the public network necessary for actuating the each exchange among the exchanges of each station or among the calculators outside of the exchanges periodically, and a step for updating the telephone call toll data within the exchange of the local station or within the calculator outside of the exchange on the basis of the transmitted and received telephone call toll data.

For instance, as shown in FIG. 25, it is possible to update the data with a step which is a method for transmitting a station line selectively from the optimum line and the route when the station line is transmitted from the private network 33, and for transmitting and receiving the telephone call data of the exchange network necessary for actuating each exchange and a step for updating the telephone call toll data 110 within the corresponding service relational data unit 586.

In Claim 8, it is possible to operate by a step for comparing the toll of each route of the combinations in transmission of the station line by combining the lines which can be contracted to determine the optimum route of the each combination within a household telephone by operation, and a step for calculating a virtual toll for every combination of the lines which can be contracted within the household telephone by operation in accordance with the result determined in the route determination step.

In Claim 9, it is possible to select a route or a line with a step for predicting a possible telephone call quantity of each route of one month according to destination from the past use information of the each route, a step for reallocating the telephone call quantity of one month according to route and according to destination so that the total telephone call toll of one month will be the lowest, and a step for selecting a route or a line in accordance with the reallocated telephone call quantity.

In Claim 10, it is possible to reallocate a possible telephone call quantity according to route and according to destination so that the total telephone call toll will be the lowest by a step for reallocating the possible telephone call quantity according to route or according to destination so that the total telephone call toll of one month will be the lowest, even if a route having a rate system in which the fixed telephone call toll is imposed up to a certain telephone call toll/a number of times of telephone call and the telephone call toll is raised when the telephone call time/the number of times of telephone call are surpassed is included.

In Claim 11, it is possible to reallocate a possible telephone call quantity according to route and according to destination so that the total telephone call toll will be the lowest by a step for reallocating the possible telephone call quantity according to route and according to destination so that the possible telephone call quantity of one month will be the lowest, even if a route having a rate system in which the telephone call toll is raised at a fixed discount rate up to the fixed telephone call time/the number of times of telephone call and the discount rate is changed for the second time when the predetermined telephone call time/the number of times of telephone call are surpassed is included.

In Claim 12, it is possible to select an optimum route from an optimum line to transmit a public network by a step for determining a ranking of the optimum routes for every fixed period from the telephone call toll data of the public network to store the information, and a step for selecting the optimum route from a void optimum line on the basis of the ranking information to transmit the public network.

In Claim 13, it is possible to select an optimum route or a line by optimum route selection means and optimum line selection means for selecting an optimum route and a line from a private network on the basis of a telephone call toll data of a public network including a line network provided by a undertaker who provides a private telephone line of every kind in an installation position of each electronic exchange, and execute a transmission selectively by transmission means through the optimum roue and the optimum line selected by the optimum route selection means and the optimum line selection means, in a private network system provided with selection means for selecting an optimum route in a station line transmission of each electronic exchange and selection means for selecting an optimum line in a trunk line transmission among the electronic exchanges.

In Claim 14, it is possible to receive the telephone call toll data of the public network in the selection of the optimum route by receiving means through the line from a central exchange of an exchange installation position of each station on which the electronic exchange is installed or a plurality of electronic exchanges.

In Claim 15, it is possible to compare the toll of each route within the combinations by toll comparison means when a user of the electronic exchange transmits the station line through the electronic exchange which will be a local station or a relay station by the combination of the routes which can be contracted, determine an optimum route or an optimum line by determination means from the result of the comparison of the toll by the toll comparison means, and calculate a virtual toll for every combination of the lines which can be contracted by virtual toll calculation means in accordance with the result determined by the determination means.

In Claim 16, it is possible to collect quality information of the each route or the line by quality information collecting means, determine a line group which was classified according to a subscriber class of a person who transmits by line group determination means on the basis of the quality information of the each route or the line collected by the quality information collecting means, and select a route or a bypass of the optimum line by specific line group selection means out of the line group determined by the line group determination means.

In Claim 17, it is possible to actuate the exchange by the selection actuation command outputted from the calculator outside of the exchange to select and transmit a route or a line by selection transmitting means, when the station line is transmitted from the private network.

For instance, as shown in FIG. 18, it is possible to transmit the line selectively by transmitting the line from the private network 33 after transmitting and receiving the telephone call toll data of the public network necessary for actuating each exchange by input/output unit 56 of the calculator 55 outside of the exchange, and then selecting the line by the selection actuation command prepared within the same external calculator 55.

In Claim 18, it is possible to transmit and receive the telephone call toll data of the public network necessary for actuating the each exchange among the calculators outside of the exchanges of each station, calculate a possible telephone call toll on the basis of the telephone call toll data received by the transmitting/receiving means, and select an optimum route or an optimum line by the line selection means.

In Claim 19, it is possible to transmit and receive the telephone call toll data of the public network necessary for actuating the each exchange by transmitting/receiving means among the exchanges of the each station or among the calculators outside of the exchanges periodically, and update the telephone call toll data within the exchange of the local station or within the calculator outside of the exchange by update means on the basis of the telephone call toll data which was transmitted and received in the transmitting/receiving means.

In Claim 20, it is possible to compare the toll of each route of the combinations in transmission of the station line by combining the lines which can be contracted with comparison/determination means, determine the optimum route of the each combination within the household telephone by the comparison/determination means, and calculate a virtual toll for every combination of the lines which can be contracted within the household telephone by virtual toll operation means in accordance with the determined result.

In Claim 21, it is possible to guess a possible telephone call quantity of one month according to each route and according to destination from the past use information of the each route by possible telephone call quantity guessing means, allocate the possible telephone call quantity guessed in the possible telephone call quantity guessing means according to the route and according to the destination by allocation means so that the total telephone call toll of one month will be the lowest, and select a route or a line by selection means in accordance with the telephone call quantity allocated by the allocation means.

In Claim 22, it is possible to reallocate the possible telephone call quantity according to the route or according to the destination by first possible telephone call quantity reallocation means so that the total telephone call toll of one month will be the lowest, even if a route having a rate system in which a fixed telephone call toll is imposed up to the telephone call toll/the number of times of telephone call and the telephone call toll is raised when the telephone call time/the number of times of telephone call are surpassed is included.

In Claim 23, it is possible to reallocate the possible telephone call quantity according to route or according to destination by second possible telephone call quantity reallocation means so that the total telephone call toll of one month will be the lowest, even if a route having a rate system in which the telephone call toll is raised at a fixed discount rate up to the telephone call toll/the number of times of telephone call and the discount rate is changed for the second time when the fixed telephone call time/the number of times of telephone call are surpassed is included.

In Claim 24, it is possible to determine the ranking of the optimum route by determination/storage means from the telephone call toll data of the public network per fixed period to store the information, and select the optimum route from a void optimum line on the basis of the ranking information of the optimum route which was determined and stored by the determination/storage means to transmit the public network by optimum route transmission means.

According to the invention by the first aspect described hereinbefore, it is possible to select the optimum line correctly at any time by calculating the line whose toll is the lowest for the destination which was dialed directly on the basis of the telephone call toll data of each station A, B and C without providing a local station access line in the transmission of the station line and an access ranking of the access line through the trunk line.

Besides, according to the invention by the second aspect described hereinbefore, it is possible to consider the line quality when the line is selected, and it is possible to select the lines which meet the demand of the subscriber who needs to secure the line quality.

Further, according to the invention by the third aspect described hereinbefore, it is possible to sum up the telephone call toll per virtual unit period and so on, and it is possible to provide raw materials for judgment when the lines to be subscribed newly and the lines whose contract should be cancelled are judged for the subscriber within the private network or the subscriber of general household, when LCR (ARS/AAR) is transmitted in reference to all of the lines which can be contracted at present including the lines that the subscriber hopes to sum up and except the lines that the subscriber hopes to exclude from the sum.

On the other hand, according to the invention of the aspects between the first to the third described hereinbefore, it is possible to contribute to the user service, since the use toll of the line user can be reduced to the maximum extent on the basis of the latest telephone call toll information.

BRIEF DESCRIPTION OF THE DRAWINGS

FIG. 2 is a type diagram indicating a network of the embodiment 1 of the present invention.

FIG. 28 is a type diagram indicating a toll characteristic of a telephone call toll system applied to the embodiments from 1 to 3 of the present invention.

FIG. 29 is a type diagram indicating a toll characteristic of a telephone call toll system applied to the embodiments from 1 to 3 of the present invention.

FIG. 30 is a type diagram indicating the table 1 applied to the embodiments from 1 to 3 of the present invention.

FIG. 31 is a type diagram indicating the table 2 applied to the embodiments from 1 to 3 of the present invention.

FIG. 32 is a type diagram indicating the table 3 applied to the embodiments from 1 to 3 of the present invention.

FIG. 33 is a type diagram indicating the table 4 applied to the embodiments from 1 to 3 of the present invention.

FIG. 34 is a type diagram indicating the table 5 applied to the embodiments from 1 to 3 of the present invention.

FIG. 35 is a type diagram indicating the table 6 applied to the embodiments from 1 to 3 of the present invention.

FIG. 36 is a type diagram indicating the table 7 applied to the embodiments from 1 to 3 of the present invention.

FIG. 37 is a type diagram indicating the table 8 applied to the embodiments from 1 to 3 of the present invention.

FIG. 38 is a type diagram indicating the table 9 applied to the embodiments from 1 to 3 of the present invention.

DETAILED DESCRIPTION OF THE PREFERRED EMBODIMENTS

Figure 1:
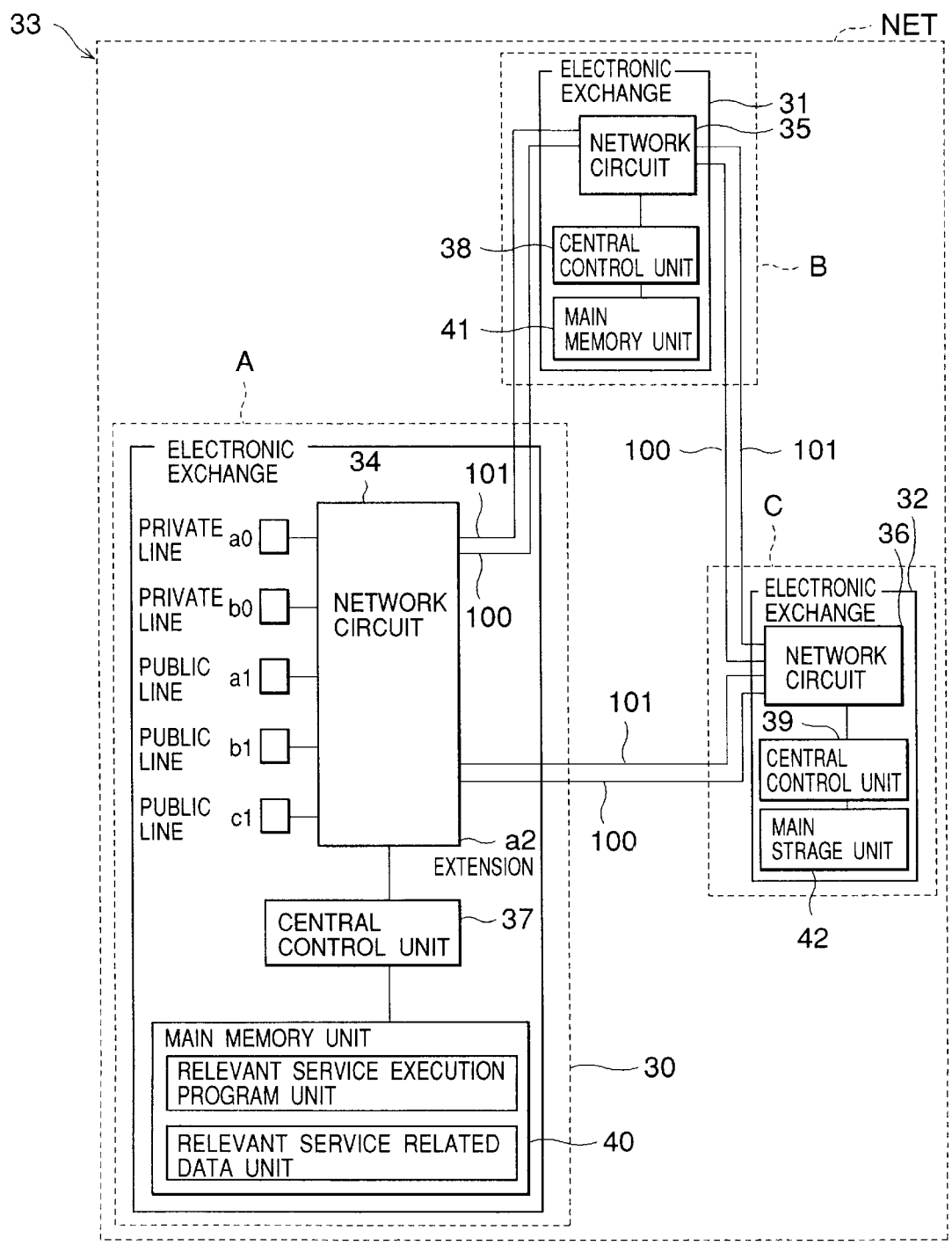
FIG. 1 is a type diagram indicating a block diagram of a principle and the embodiment of the present invention.

The embodiments of the present invention will be described by referring to the drawings from FIG. 1 to FIG. 24.

<EMBODIMENT 1>

[OUTLINE OF THE EMBODIMENT 1]

The embodiment 1 will be described regarding station A as a local station A and regarding station BC as other station BC according to circumstances.

The system of the embodiment 1 is a system for executing a signal processing for the local station A or other stations B and C from a central control units 37, 38 and 39 . . . installed on each station A, B and C . . . within the private network 33.

[CONTENT OF THE EMBODIMENT 1]

FIG. 1 is a block diagram indicating a whole system of one embodiment of the present invention. In FIG. 1, A, B and C indicate each telephone station (referred to as the first station, the second station and the third station hereinafter).

Besides, the private network 33 is composed of an electronic exchange 30, an electronic exchange 31 and an electronic exchange 32.

The electronic exchanges 30–32 are connected by lines 100 and 101 one another. An analog trunk line, ISDN line and digital line exist as the line 100.

The electronic exchanges 30–32 are provided with private lines a0 and b0, public lines a1–c1 and extensions a2–c2 connected to network circuits 34 36, and central control unit 37–39 and main storage units 40–42 connected to the network circuits 34–36.

Further, in the electronic exchanges 31 and 32, the illustration of the private lines a0 and b0, the public lines a1–c1 and extensions a2–c2 is omitted.

The network circuit 34 will be further described. As shown in FIG. 1, the private lines ($a_o$, $b_o$), the public lines ($a_1$, $b_1$, $c_1$) and the extensions (a2–c2) are connected to the network circuit 34.

As shown in FIG. 2, a telephone call toll data 110 in each station A, B and C is transmitted to the each station A, B and C by such means as the analog trunk line, ISDN line, digital line 100 or mailing.

Besides, corresponding service execution program units and corresponding service relational data units are stored per each address area in the main storage units 40–42.

Further, the illustration of the corresponding service execution program units and the corresponding service relational data units is omitted in reference to the main storage units 40–42.

FIG. 2 is an illustration indicating an actual network connection example of the electronic exchanges 30–32 of FIG. 1.

In FIG. 2, for instance, the telephone call toll data 100 is written into the storage area of the electronic exchange 42 through private line networks 45 and 46, when data terminals 50 and 51 of a private line undertaker (or a undertaker of public line is included) are used.

Hereupon, the data terminal 51 of the private line undertaker is connected by public network 47 and the private line through the private line network 46.

It is also possible to send the telephone call data 110 to a relay station on which the electronic exchange 42 is installed by mail, when the data terminal 51 of the private line undertaker is used.

The telephone call toll data 110 transmitted from the data terminals 50 and 51 of the private line undertaker is transferred to the storage area of the electronic exchange 43 or the electronic exchange 44, for instance, after it is written into the storage area of the electronic exchange 42, and the telephone call toll is calculated on the basis of the transferred data.

The electronic exchange 43 functions as a central station.

Further, a maintenance console for operating and maintaining the electronic exchange is installed on the electronic exchanges 42–44 respectively.

Then, a process of the telephone call toll data 110 in the private network 33 described in FIG. 1 will be described by referring to the flowcharts of FIG. 3 and FIG. 4.

First of all, the process of the telephone call toll data 110 in the private network 33 described in FIG. 1 will be described by referring to the flowchart of FIG. 3.

<THE PROCESS IN A TRANSMITTING STATION WITHIN THE PRIVATE NETWORK>

Figure 3:
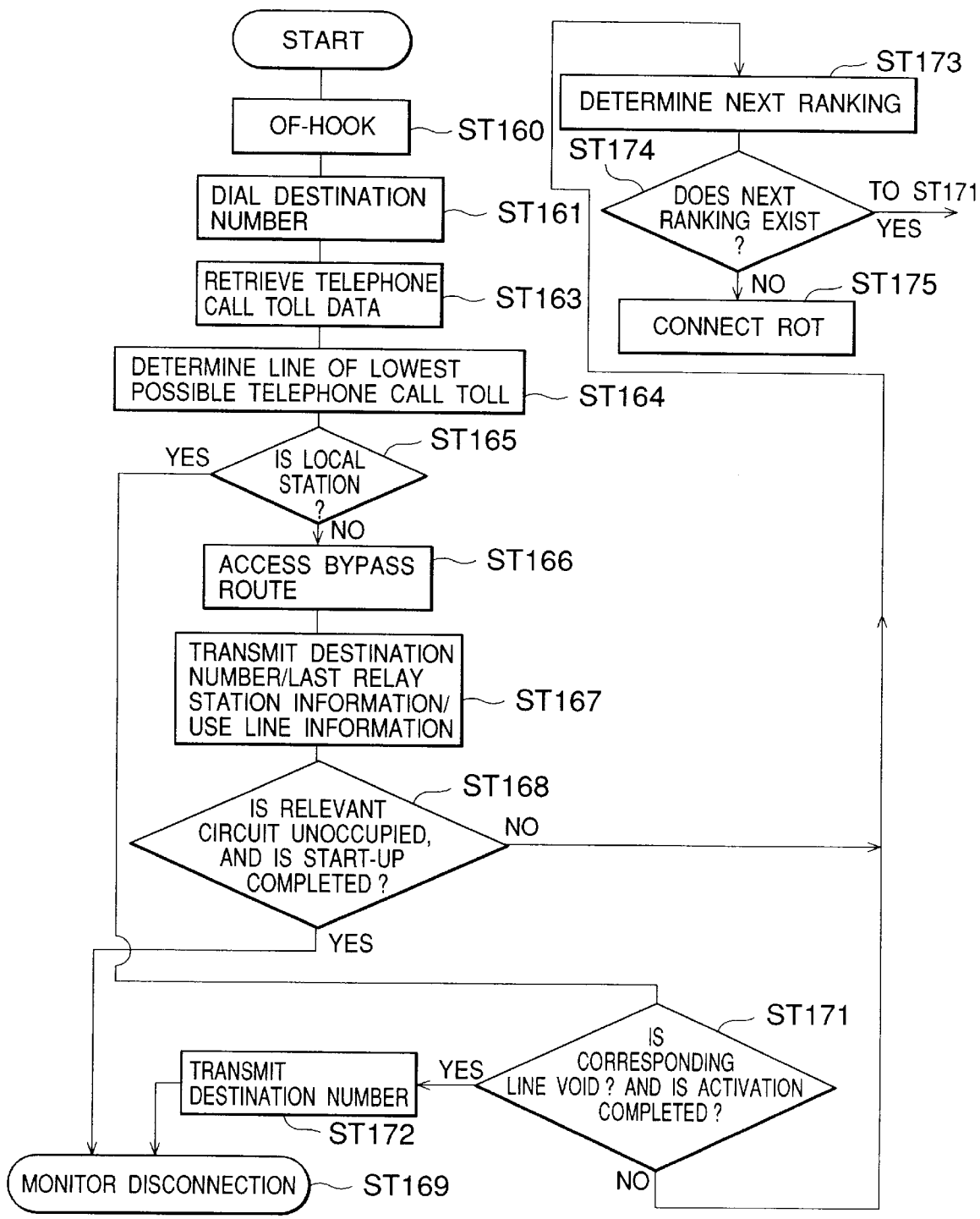
FIG. 3 is a flowchart indicating a process in a private network of the embodiment 1 of the present invention.
Figure 4:
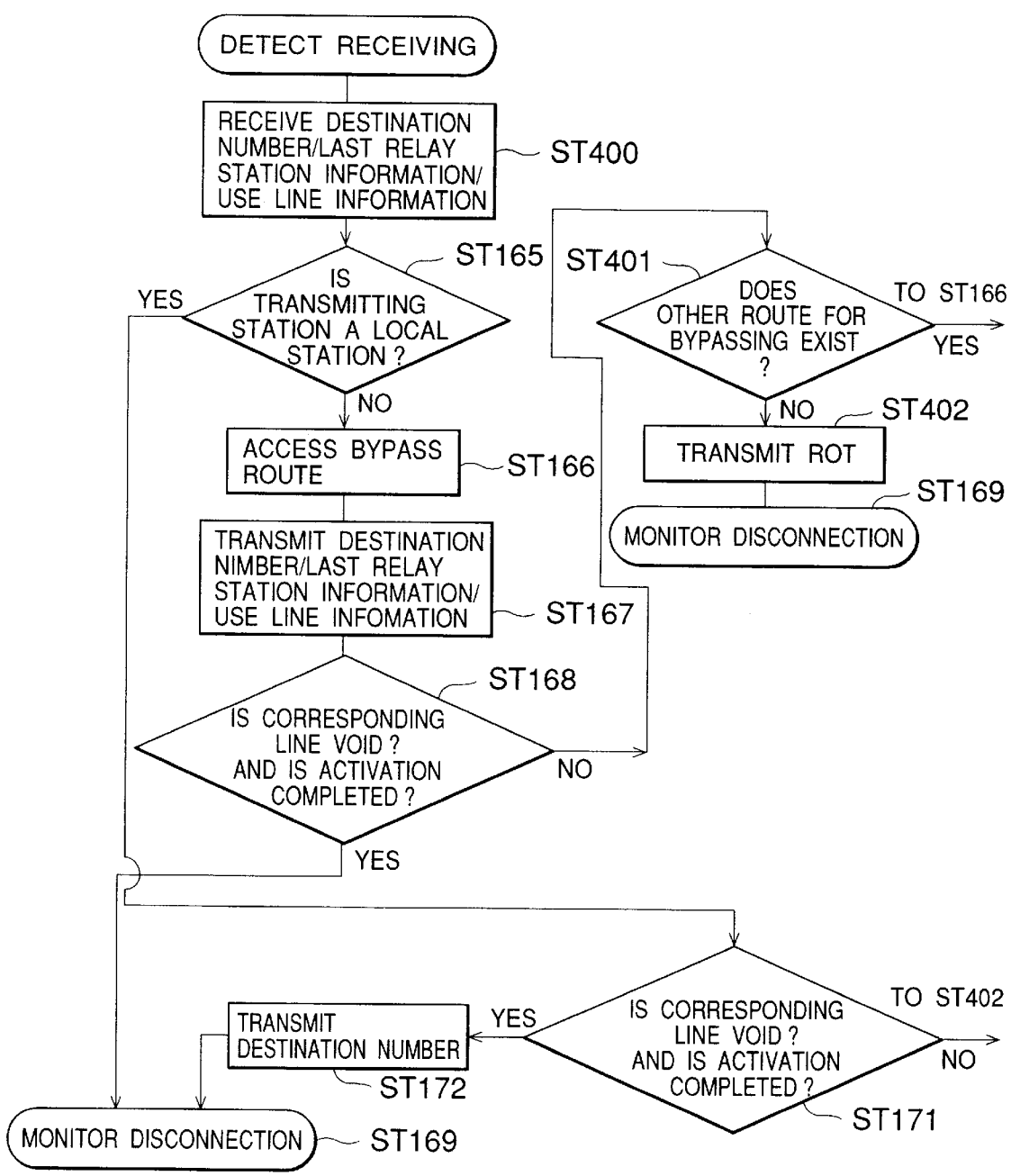
FIG. 4 is a flowchart indicating a process in a private network of the embodiment 1 of the present invention.

In the process of the transmitting station of each electronic exchange 30–32 within the private network shown in FIG. 3, a destination number is dialed after a special number is inputted (ST 161), since a transmitter in the private network 33 uses one service of an optimum route selection LCR (Least Cost Routing)[ARS (Automatic Route Selection)] for selecting a station line of stations A, B and C in which a transmission is executed or an optimum route selection function AAR (Automatic Alternate Routing) for selecting an optimum line when the transmission is executed through the trunk line, for instance, after off-hooking the telephone (ST 160).

At this moment, a local code or an area code, and a local code of the destination number are dialed, and the lines corresponding to the codes can be used.

The table 1 indicates a data 200 concerning the available lines from a telephone station (referred to as the first station for short hereinafter) on which the first electronic exchange is installed, a data 201 concerning the available lines from the telephone station (referred to as the second station for short hereinafter) on which the second electronic exchange is installed and a data 202 concerning the available lines from the telephone station (referred to as the third station for short hereinafter) on which the third electronic exchange is installed.

The table 1 is shown in FIG. 30.

The table 2 indicates, for instance, a data 203 of initial telephone call toll A1 per a1 minute and a data 204 of additional toll A2 per a2 second.

The table 2 is shown in FIG. 31.

The table 3 indicates a total telephone call data 205 in a possible telephone call time when the total telephone call toll was calculated previously for every segment of the possible telephone call time from the telephone call toll data shown in the table 2.

The table 3 is shown in FIG. 32.

The table 4 indicates a toll data 206 for the corresponding destination of public line A zone, a toll data 207 for the corresponding destination of private line B zone and a toll data 208 for the corresponding destination of public line A zone.

The table 4 is shown in FIG. 33.

The telephone call data per line (A line, B line and C line . . . ) which can be talked to the corresponding destination number (local code, or area code and local code) in the first station A, the second station B and the third station C is retrieved from the data based on the above-mentioned tables 1–4 by the central control unit 37 of the electronic exchange 30 shown in FIG. 1 (ST 163 in FIG. 3).

The possible telephone call toll corresponding to the corresponding possible telephone call time is calculated for every available line on the basis of the formula of the following table 5 and the data concerning the initial telephone call toll A1–C1 and the data concerning the additional toll A2–C2 of the table 4, and the calculated possible telephone call toll is compared respectively to determine the line of the lowest possible telephone call toll, after the telephone call toll data is retrieved by the central control unit 37 (ST 164 in FIG. 3).

Further, the table 5 indicates a calculation formula for calculating the telephone call toll $\alpha$, $\beta$, $\gamma$ term among each of the stations A, B and C.

The table 5 is shown in FIG. 34.

For instance, the possible telephone call toll when t time has passed can be indicated by the calculation formula of $(\alpha+\beta+\gamma)$ term.

The central control unit 37 shown in FIG. 1 judges whether or not a transmitting station (referred to as "last relay station" hereinafter) to the line whose telephone call toll will be the lowest is a local station, after the determination is executed by the central control unit 37 shown in FIG. 1 (ST 165).

It is judged whether or not the corresponding line is void (ST 171), when it is judged by the central control unit 37 shown in FIG. 2 that the last relay station of the first ranking is a local station.

When it is judged that the corresponding line is void, the line is accessed and the destination number is transmitted (ST 172).

Then, a monitoring is executed until the line is disconnected (ST 169).

Further, the table 6 indicates A, B, C line relational data which is the telephone call toll data in the available lines corresponding to the destination (the local code, or the area code and the local code).

The table 6 is shown in FIG. 35.

On the other hand, the trunk line for bypassing the corresponding last relay station is accessed (ST 166), when it is judged by the central control unit 37 shown in FIG. 1 that the last relay station of the line whose telephone call toll will be the lowest is not a local station A in the ST 165.

The information of the last relay station and the use line information or an access code of the last relay station and an access code of the use line are transmitted to the trunk line with the destination number through the analog trunk line, the digital line and the ISDN line (ST 167), after the trunk line is accessed.

It is judged whether or not the activation is completed, when the line corresponding to the transmitted code is void (ST 168).

Hereupon, the central control unit 37 shown in FIG. 2 monitors the disconnection of the line, when it is judged that the line corresponding to the transmitted code is void and the activation is completed. Then, in the central control unit 37, the process is finished after confirming the disconnection of the line.

On the other hand, the possible telephone call toll determines the line of the next ranking (ST 173) and executes the determination of ST 165 for the second time, when it is judged that the line corresponding to the transmitted code is not void nor the activation is not completed in ST 168, namely when a fault occurred in the line.

Besides, the possible telephone call toll determines the line of the next ranking (ST 173) and judges whether or not the next ranking exists (ST 174), when it is judged that the line corresponding to the transmitted code is not void nor the activation is not completed in the ST 171.

Hereupon, the possible telephone call toll executes the determination of ST 165 for the second time, when it is judged that the next ranking exists.

Besides, a Re-Order Tone (ROT) is connected, when it is judged that the next ranking does not exist (ST 175).

Further, although the detailed description of the monitoring process is omitted in the disconnection monitoring within the private network 33 (ST 169), the line is released when it is judged that the line is disconnected. Besides, the monitoring is repeated until the line is disconnected, when it is judged that the line is not disconnected.

<THE PROCESS IN THE RELAY STATION WITHIN THE PRIVATE NETWORK>

Then, the process in the relay station within the private network 33 will be described by referring to the flowchart of FIG. 4.

The information of the last relay station and the use line information are received through the analog trunk line, the digital line and the ISDN line, after the information is transmitted from other station within the private network to the local station A and the receiving is detected (ST 400).

The access code of the last relay station and the access code of the use line can be substituted as the information of the last relay station and the use line information.

Besides, it is judged whether or not the last relay station is the local station A after the information of the last relay station and the use line information are received (ST 165).

The following processes ST 166–ST 172 are the same as those of FIG. 3 described hereinbefore, so the description about them will be omitted.

Further, it is judged whether or not another route for bypassing exists (ST 401), when the line corresponding to the transmitted code is not void, nor the activation is not completed in ST 171.

The bypass route of ST 166 described hereinbefore is accessed, when it is judged that another route for bypassing exists.

On the other hand, the of Re-Order Tone (ROT) is connected, when another route for bypassing does not exist (ST 402).

The disconnection monitoring of ST 169 is executed after the Re-Order Tone (ROT) is connected.

Then, the processing method when other station within the private network 33 is requested to determine the optimum line out of the lines which can be transmitted from other station or the lines which can be used from all of the stations will be described.

<THE PROCESS WHEN OTHER STATION IS REQUESTED TO EXECUTE ONE PART OF OPTIMUM ROUTE DETERMINATION OR ALL OF THE OPTIMUM ROUTE DETERMINATION>

Figure 5:
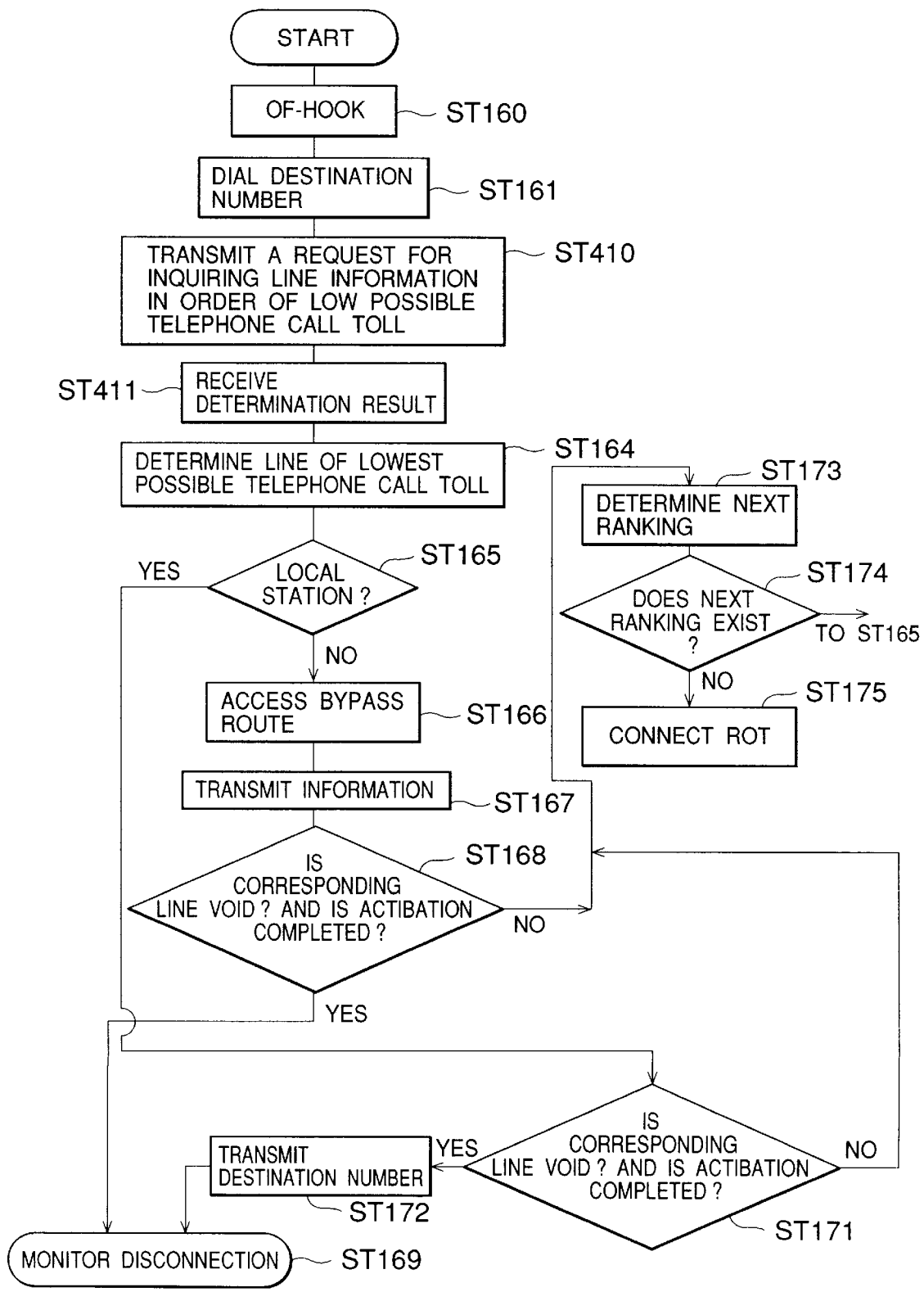
FIG. 5 is a flowchart indicating a process in an exchange of the embodiment 1 of the present invention.

FIG. 5 is a flowchart for describing the processing method when other station is requested to execute one part of optimum route determination or all of the optimum route determination.

In the electronic exchanges 30–32 shown in FIG. 5, the destination number of the other party is dialed following the input of a special number for using one service of optimum route selection function in the transmission of station line or optimum route selection function in the transmission of trunk line (ST 161), after the telephone is off-hooked (ST 160).

At this moment, the dialed local code or the area code and the local code of the other party are dialed, and the lines corresponding to the codes are made available.

Then, a request for inquiring the lines (A line, B line and C line . . . ) which can be talked over the telephone concerning the corresponding destination number (the local code, or the area code and the local code) in the first station, the second station and the third station, and the line information in order of low possible telephone call toll are transmitted to other station or the central station from the dada based on the tables 1–4.

The line whose possible telephone line toll is the lowest is determined (ST 164) after the line information in order of the low possible telephone call toll is received (ST 411).

The same process as the flowchart described in FIG. 3 will be executed as follows.

<THE PROCESS WHEN THE EXTERNAL CALCULATOR IS REQUESTED TO DETERMINE AN OPTIMUM ROUTE>

Then, the process when the external calculator is requested to determine an optimum route will be described by referring to the flowchart of FIG. 6.

Figure 6:
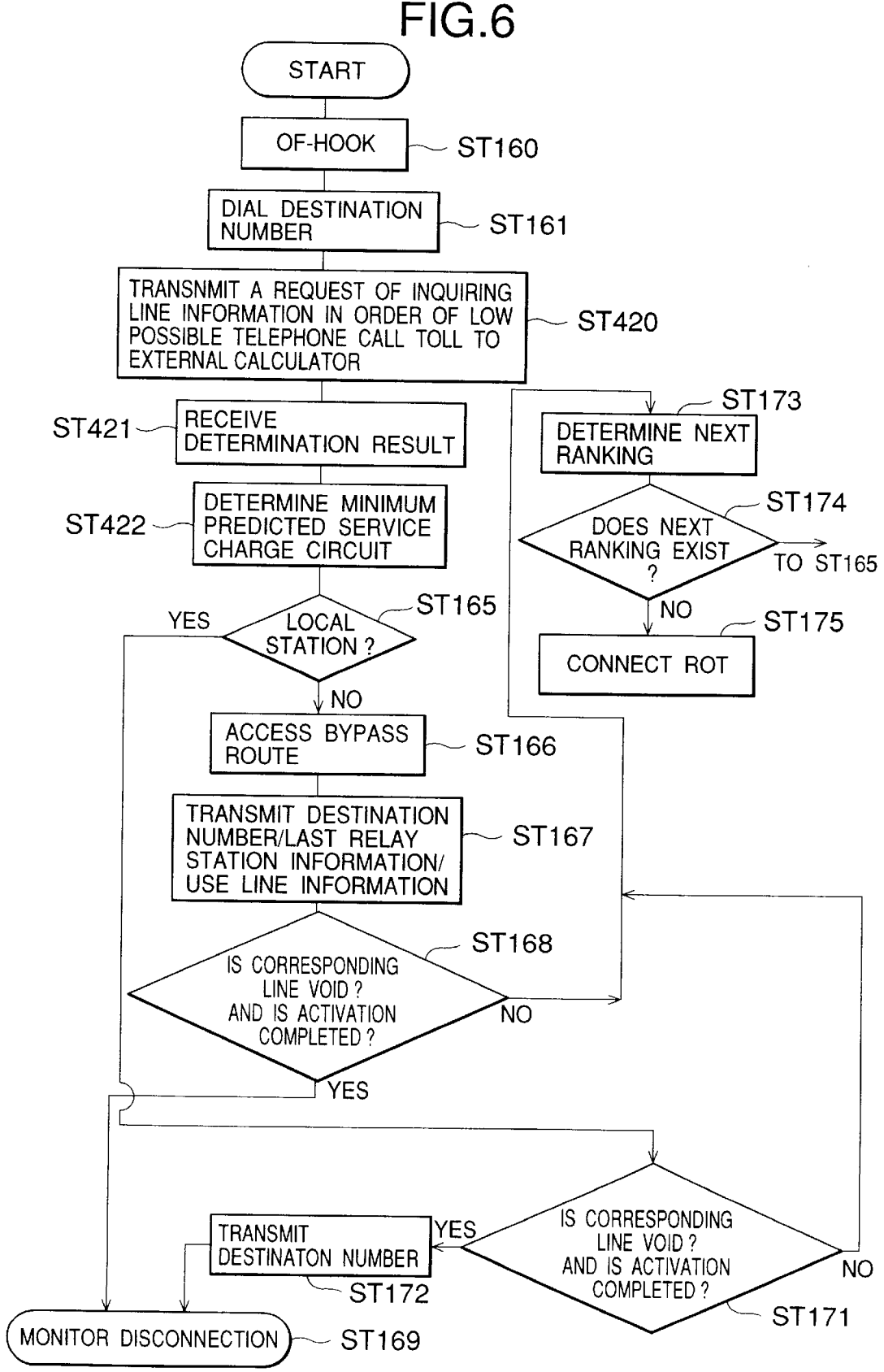
FIG. 6 is a flowchart indicating a process in an exchange of the embodiment 1 of the present invention.

In the process of FIG. 6, the destination number of the other party is dialed following the input of the special number for using one service of the optimum route selection function in the transmission of trunk line or the optimum route selection function in the transmission of trunk line (ST 161) for instance, after the telephone is off-hooked (ST 160), like the process shown in FIG. 5.

After that, the request for inquiring the line information in order of low possible telephone call toll is transmitted to the external calculator, and the determination result is received from the external calculator (ST 421).

It is judged whether or not the last relay station is the local station A so that the line of the first ranking will be accessed, after the determination result is received from the external calculator (ST 165).

The same process as the flowchart described in FIG. 3 will be executed as follows.

Figure 8:
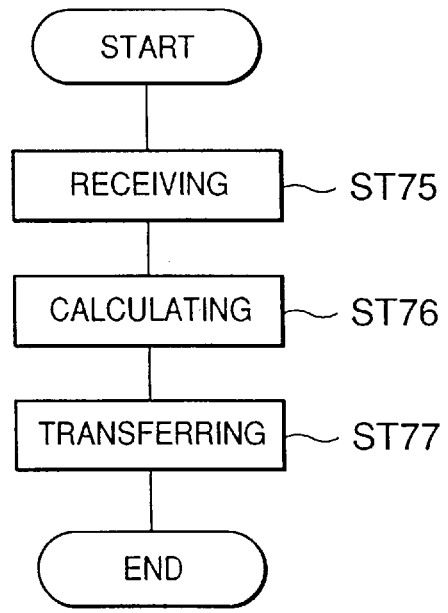
FIG. 8 is a flowchart indicating a process in the embodiment 1 of the present invention.

On the other hand, in other station, as shown in FIG. 8, the inquiry request concerning the line information in order of low possible telephone call toll of the lines which can be talked to the corresponding destination number is received from the local station A (ST 75).

The same calculation and the determination as those described in ST 164 shown in FIG. 3 are executed, after the inquiry request is received (ST 76).

As a result, the ranking information of the line is transferred to the station which originated the inquiry through the analog trunk line, the digital line and the ISDN line (ST 77).

<THE REGISTRATION PROCESS OF LINE DESIGNATION/LINE EXCLUSION FOR CALCULATING THE POSSIBLE TELEPHONE CALL TOLL ACCORDING TO COMBINATION OF THE LINE>

The process for accepting the input of the designated line or the exclusion line from each station A, B and C within the private network 33, a maintenance console of the central station A, or the specific extension will be executed.

Figure 11:
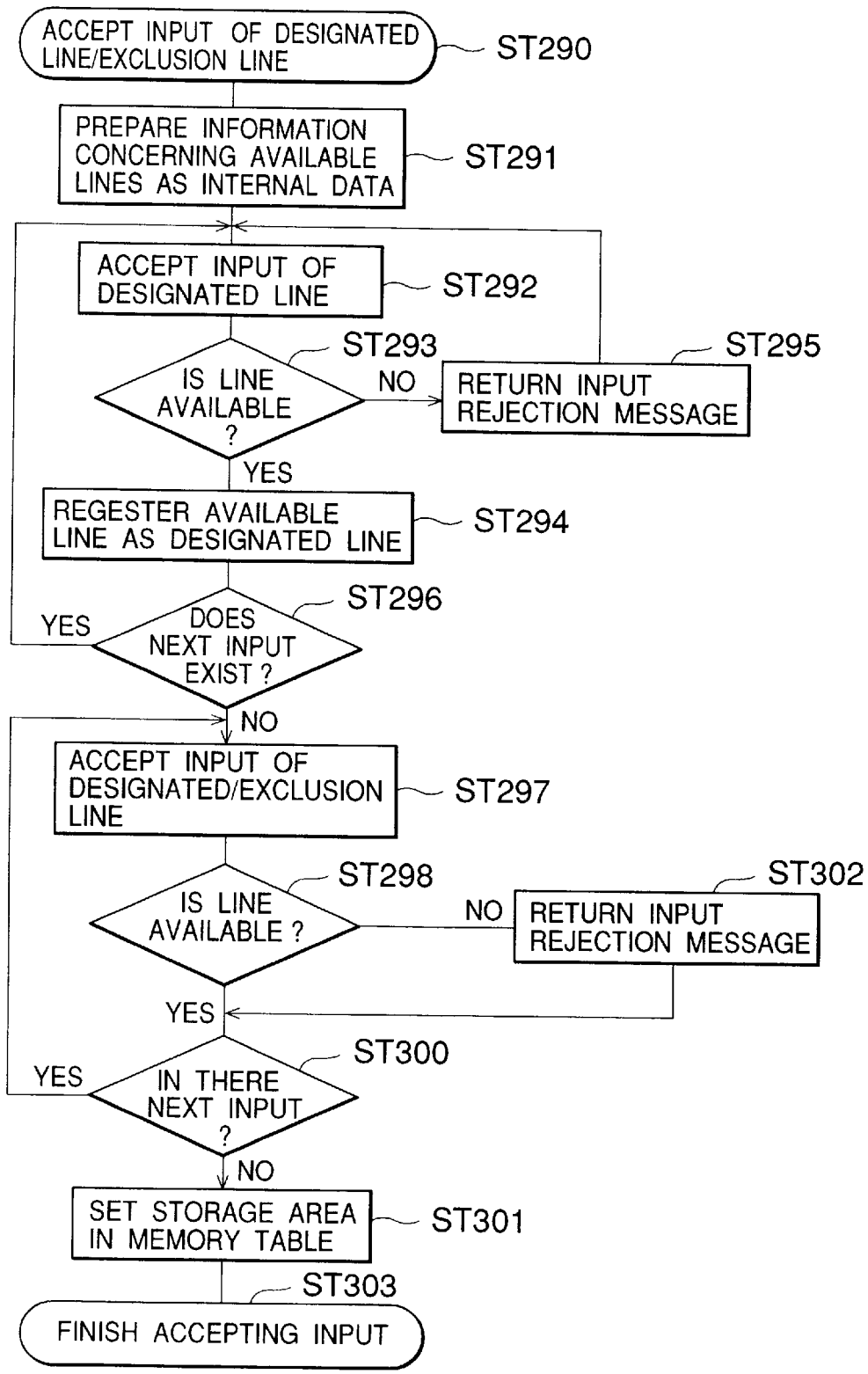
FIG. 11 is a flowchart indicating a process in the embodiment 1 of the present invention.

As shown in FIG. 11, the input of the designated line or the exclusion line is accepted in each station A, B and C within the private network 33 or the central station A (ST 290).

The information concerning the lines including the non-contracted lines (the public line and private line through the public line) which can be used from other station is prepared as an internal data through the local line A or the trunk line in accordance with the data of FIG. 1–FIG. 6 which was shown previously, after the input is accepted (ST 291).

Then, the designated line is accepted in each station A, B and C or the central station A within the private network 33 (ST 292).

It is determined whether or not the lines registered previously in ST 291 exist in the data prepared previously in ST 291 after the input of the designated line is accepted (ST 293).

The lines are registered in the internal data of the present program as designated lines, when it is judged that the lines are available (ST 294).

The input rejection message is returned (ST 295)and the process of ST 292 is executed for the second time, when it is judged that the lines are not available.

Then, it is judged whether or not the next input of the designated line exists (ST 296).

The process of ST 292 is executed, when it is judged that the next input of the designated line exists.

On the other hand, the input of the exclusion line is accepted, when it is judged that the next input of the designated line does not exist (ST 297).

The input of the lines to be excluded from the sum object is accepted, when the input of the exclusion line is accepted.

It is judged whether or not the exclusion line does not conform with the lines registered in ST 294 and the line exists in the data prepared in ST 291 (ST 298), after the input of the exclusion line is accepted.

The line is registered in the internal data of the present program as a line excluded from the sum (ST 299), when the line existing in the inputted data does not conform with the lines registered in ST 294, and the line exists in the data prepared in ST 291.

Besides, the input rejection message is returned (ST 302) and the process of ST 297 is executed for the second time, when it is judged that the processed line conforms with the lines registered in ST 294 or the line does not exist in the data stored in ST 291.

Then, it is judged whether or not the next input of the exclusion line exists (ST 300).

Hereupon, the process of ST 297 is executed, when it is judged that the next input of the exclusion line exists.

On the other hand, a memory area of the combination number and the line number of the minimum possible telephone call toll of mounting line at the maximum is set in a memory table installed on the storage area, when it is judged that the next input of the exclusion line does not exist in ST 300.

As mentioned hereinbefore, the storage area of the sum designated line and the sum exclusion line is set in the memory table to finish accepting the input of the all available sum designated line and the sum exclusion line of telephone call toll comparison.

By these actions, it will be possible to compare the virtual telephone call toll for the every month concerning the all combinations of the lines including the sum designated line and except the sum exclusion line from the all available lines.

<THE PROCESS FOR INPUTTING THE DESIGNATION FOR A STARTING/FINISHING DATA AND AN OUTPUT PERIOD OF POSSIBLE TELEPHONE CALL TOLL CALCULATION ACCORDING TO COMBINATION OF LINES>

The telephone call toll information according to combination of the line is outputted for every output period, after the designation for a starting/finishing date and an output period of the telephone call toll calculation according to combination of the line is received from a specific extension within the private network 33 or a maintenance console of the specific electronic exchange.

Figure 12:
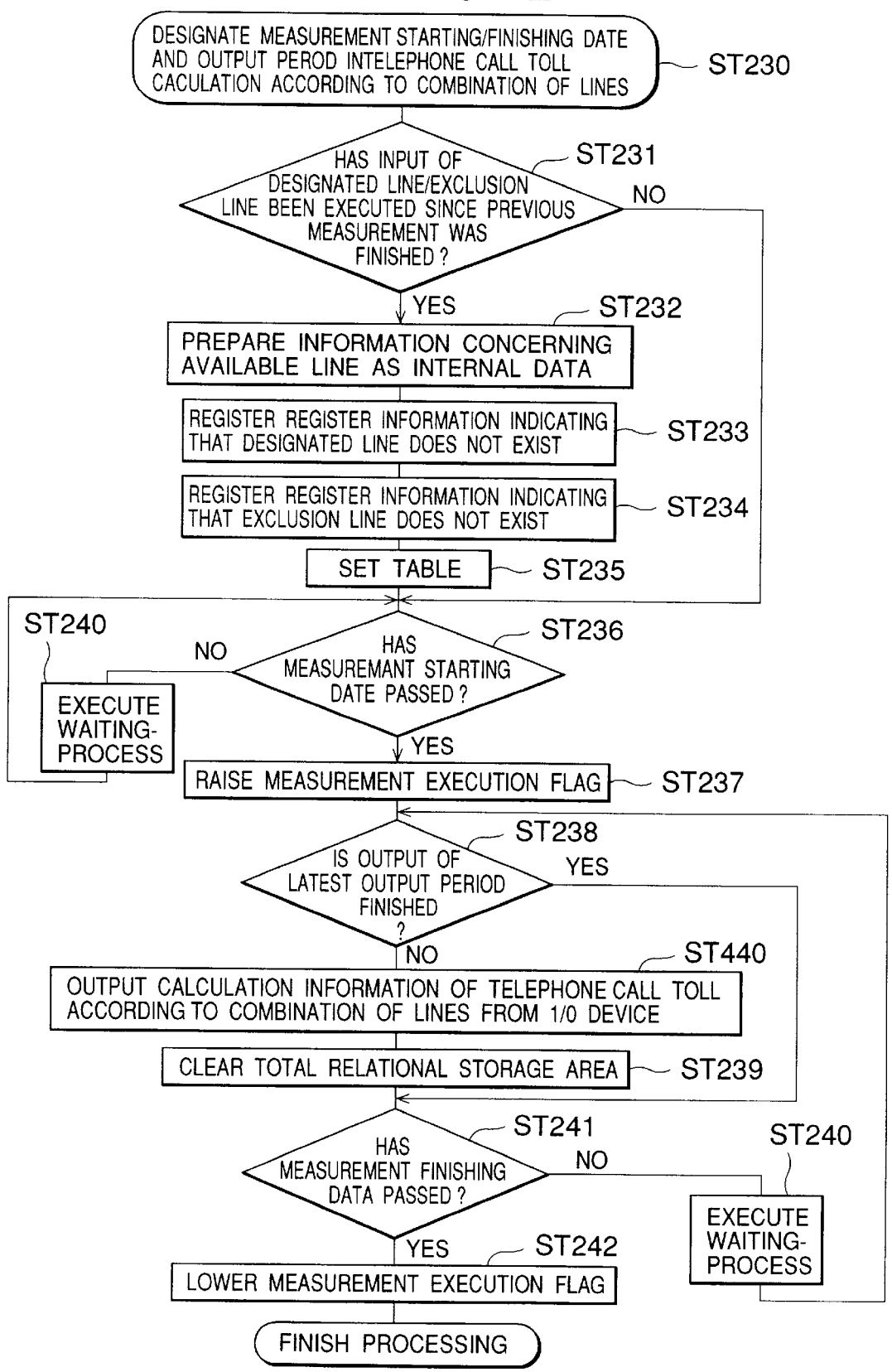
FIG. 12 is a flowchart indicating a process in the embodiment 1 of the present invention.

First of all, as shown in FIG. 12, the process for inputting the designation for the measurement starting/finishing date and the output period of the possible telephone call toll calculation according to combination of the all available lines of LCR (ARS)/AAR is started from each of the electronic exchanges 30, 31 and 31 within the private network, the maintenance console in the central station A or the specific extension (ST 230).

Hereupon, the designation is executed per hour, per day, per month and so on as the output period.

In the process, first of all, it is confirmed whether or not the input of the sum designated line/the sum exclusion line has been executed since the previous measurement was finished (ST 231).

The same internal data as ST 291 shown in FIG. 11 is prepared (ST 232), when it is confirmed that the input has not been executed.

Then, the information indicating that the sum designated line does not exist is registered in the internal data of the present program (ST 233).

The information indicating that the sum exclusion line does not exist is registered in the internal data (ST 234), after the information indicating that sum designated line does not exist is registered in the internal data of the present program.

Then, the same table as ST 301 shown in FIG. 11 is set (ST 235).

Secondly, it is judged whether or not the measurement starting date has passed (ST 236).

Figure 13:
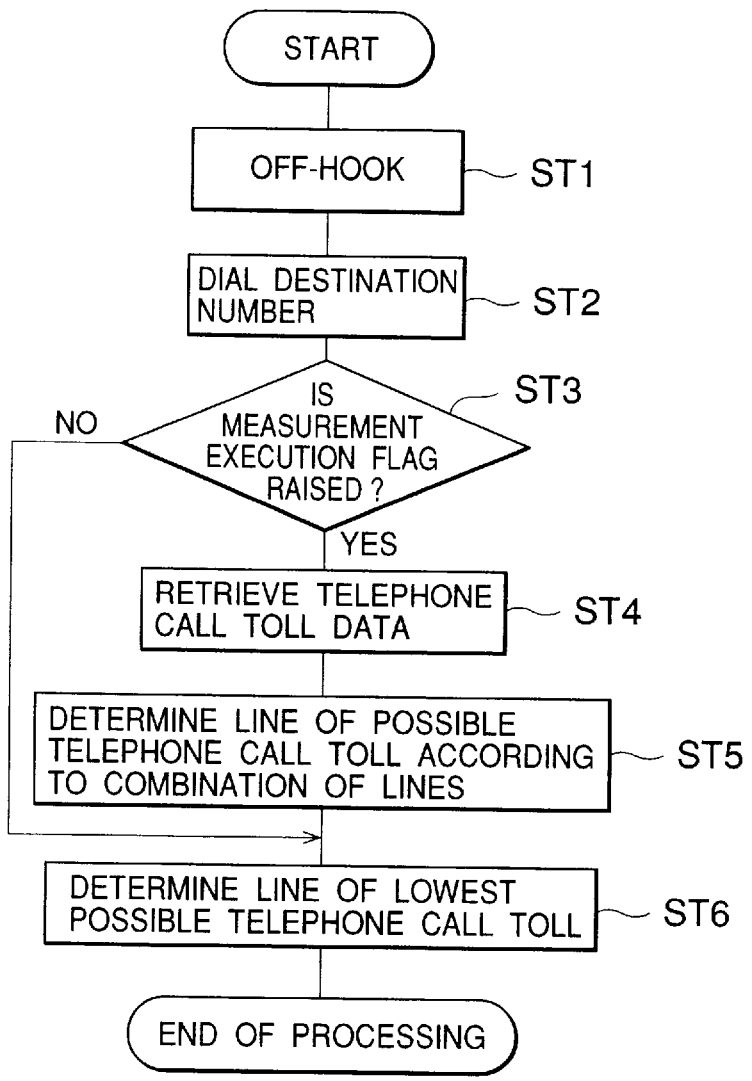
FIG. 13 is a flowchart indicating a process in the deformed example 1 of the embodiment 1 of the present invention.

A flag for executing measurement is raised to execute a telephone call toll calculation step according to combination of lines in the transmission of LCR [ARS/AAR] shown in FIG. 13 (Step 237), when the measurement starting date has passed.

It is judged whether or not the output of the latest output period is finished (ST 238) after the flag for executing measurement is raised.

It is judged whether or not the measurement finishing date has passed (ST 241), when the output of the latest output period is finished.

Besides, the telephone call toll calculation information according to combination of the line is outputted from an I/O device (ST 440), when the output of the latest output period is not finished.

Then, the total relational storage area is cleared (ST 239) to execute the judgment of ST 241.

The flag for executing measurement is lowered (ST 242) to finish the process, when the measurement finishing data has passed.

A waiting-process is executed (ST 240) to execute the judgment of ST 238, when the measurement finishing date has not passed.

Further, the waiting-process is executed (ST 240) to execute the judgment of ST 236 for the second time when the measurement starting date has not passed in the ST236.

It will be possible to output the telephone call toll calculation information according to combination of the lines in each of the stations A, B, C periodically after receiving the date designation and the periodic destination from the specific extension within the private network 33 or the maintenance console of the specific electronic exchange, if the process shown in the above-mentioned FIG. 12 is executed.

<THE PROCESS FOR CALCULATING THE TELEPHONE CALL TOLL ACCORDING TO COMBINATION OF THE LINE IN THE TRANSMISSION OF LCR (ARS)/AAR>

As shown in FIG. 13, the process after the measurement-execution-flag for executing each process is raised is executed in the transmission of LCR (ARS)/AAR, or in the disconnection monitoring process in the disconnection monitoring of ST 169 of FIG. 3.

After the process of ST 1 and ST 2, it is judged whether or not the measurement-execution-flag for executing the calculation process of the telephone call toll according to combination of the line is raised (ST 3), and the possible telephone call toll for all of the available lines is calculated, for instance, by the central control unit 31 described in FIG. 1, when the flag is raised.

The line in which the telephone call toll will be the lowest within each combination provided for Table 7 is determined (ST 4), after calculating the possible telephone call toll. Hereupon, Table 7 is shown in FIG. 36 and Table 8 is shown in FIG. 37.

Then, the line number of the minimum possible telephone call toll according to combination corresponding to the transmitting extension is registered in the data of Table 8 at the same time.

Then, the same determination as FIG. 3 concerning a real subscription line is executed (ST 5) to execute the transmission.

It will be possible to sum up the real telephone call toll based on the real telephone call time, if the above-mentioned process is executed.

<THE REAL TELEPHONE CALL TIME CONCERNING THE LINE WHOSE POSSIBLE TELEPHONE CALL TOLL IS THE LOWEST ACCORDING TO COMBINATION OF THE LINE AFTER DISCONNECTING THE TRANSMITTING EXTENSION/THE PROCESS FOR CALCULATING THE REAL TELEPHONE CALL TOLL>

Figure 14:
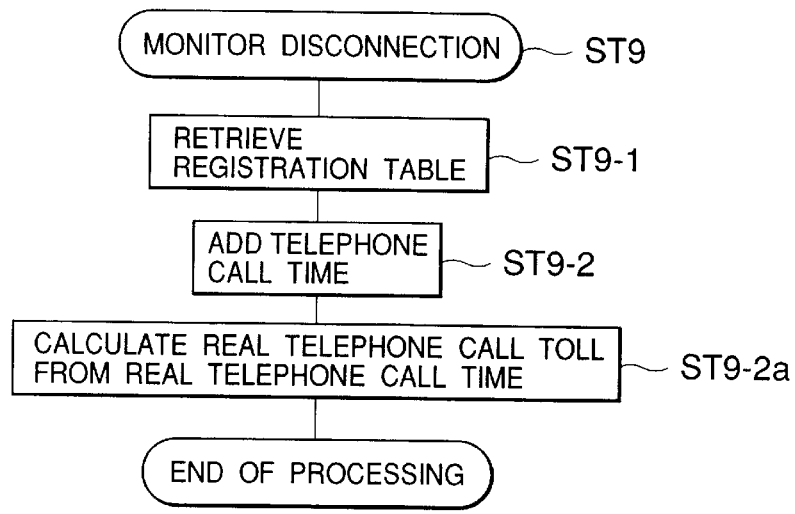
FIG. 14 is a flowchart indicating a process in the embodiment 1 of the present invention.

As shown in FIG. 14, the addition of the real telephone call time concerning the line whose possible telephone call toll is the lowest according to combination of the line, the calculation of the telephone call toll based on the real telephone call time and the addition of the number of times of the telephone call are executed after monitoring the disconnection of the transmitting extension.

By these actions, it will be possible to calculate the toll according to the real telephone call time.

<THE PROCESS OF THE DETERMINATION IN THE TRANSMITTABLE LINE GROUP CORRESPONDING TO THE SUBSCRIBER CLASS>

Figure 15:
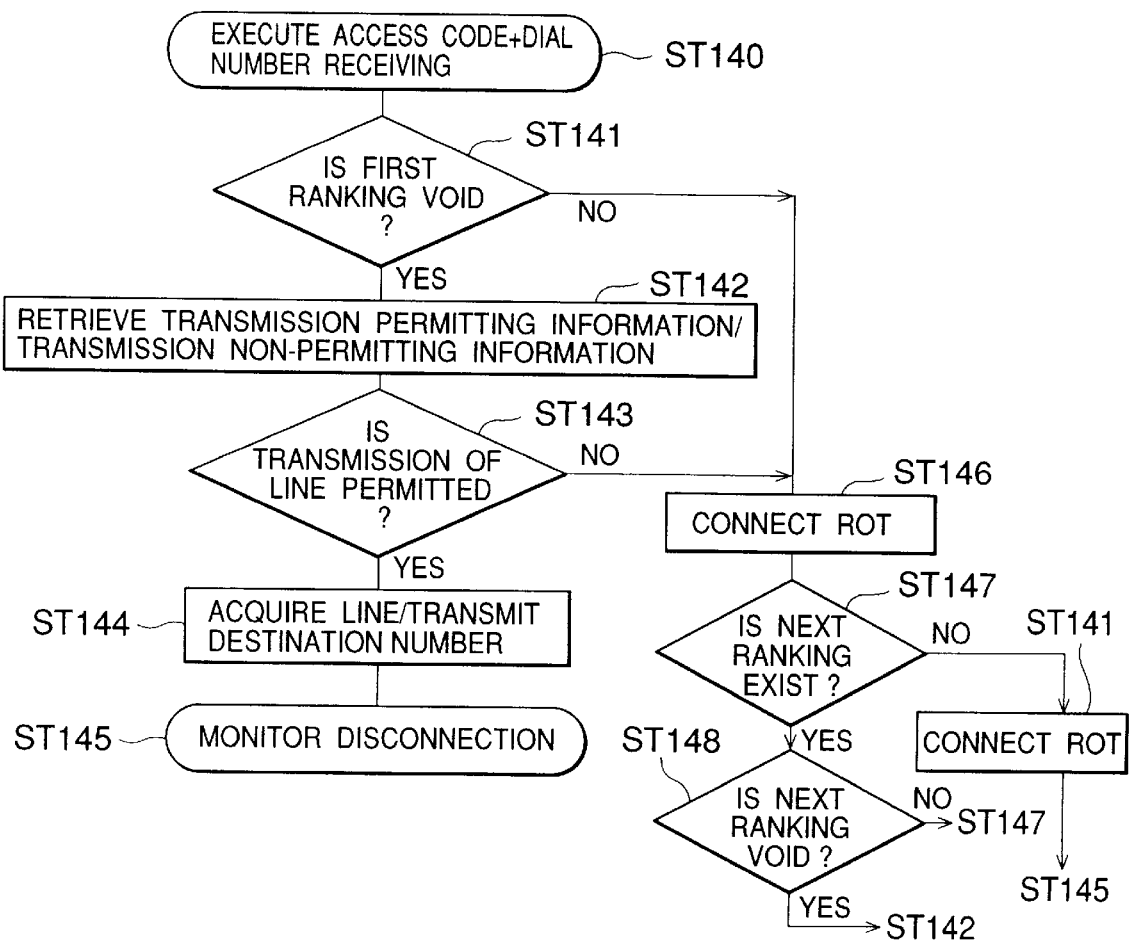
FIG. 15 is a flowchart indicating a process in the embodiment 1 of the present invention.

As shown in FIG. 15, the receiving of an access code+dial number of LCR (ARS/AAR) is executed in each of the exchanges 30, 31 and 32 within the private network 33 (ST 140).

After that, it is judged whether or not the first ranking is void (ST 141).

It is determined whether or not the transmission of the corresponding line is permitted in the subscriber class of the corresponding extension (ST 142 and ST 143), when the first ranking is void.

The corresponding line is acquired to transmit the destination number to the counter station (ST 144), when the transmission of the corresponding line is permitted.

The disconnection is monitored after the destination number is transmitted to the counter station (ST 145). In the monitoring of the disconnection (ST 145), the same process as the disconnection monitoring executed in the above-mentioned ST 9, ST 48 and ST 135 is executed.

Further, it is determined whether or not the next ranking exists (ST 147), when the corresponding trunk is not void.

Hereupon, Re-Order Tone (ROT) is connected (ST 146), and the disconnection monitoring of ST 145 is executed when the next ranking does not exist.

On the other hand, it is determined whether or not a void trunk exists in the next ranking when the next ranking exists, and the processes following ST 142 are executed when the void trunk exists. Besides, the processes following ST 147 are executed when the next ranking is not void.

On the other hand, Table 9 indicates a storage area of data which provide each class of the extension with a permissible upper limit quality class and a lower limit quality class, and a quality determination result according to each line.

Figure 9:
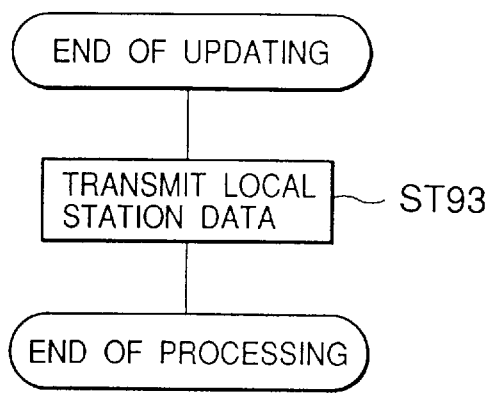
FIG. 9 is a flowchart indicating a process in the embodiment 1 of the present invention.

It is possible to meet the demands of the subscriber who needs to secure the line quality, since it is possible to consider the quality of the line when the line is selected by using the data stored in FIG. 9.

Hereupon, Table 9 is shown in FIG. 38.

<THE PROCESS FOR DETERMINING THE LINE RANKING IN ORDER OF LOW POSSIBLE TELEPHONE CALL TOLL IN OTHER STATION>

Figure 16:
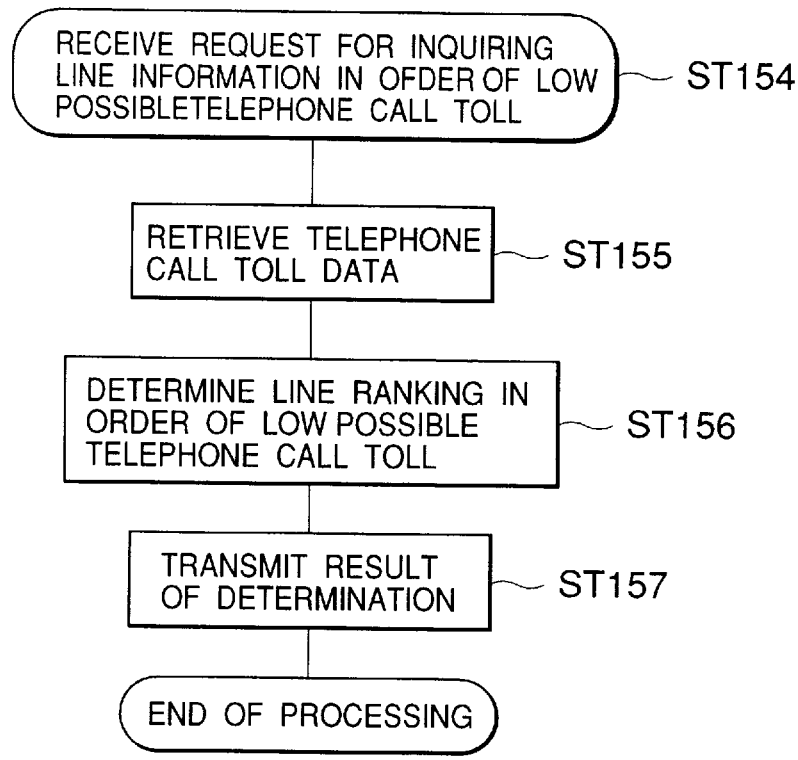
FIG. 16 is a flowchart indicating a process in the embodiment 1 of the present invention.

As shown in FIG. 16, a request for inquiring the line information is received in order of low possible telephone call toll(ST 154). At this moment, the telephone call toll data concerning the lines (A line, B line and C line . . . ) which can be talked to the corresponding destination number (area code+local code, local cede) of the first station, the second station and the third station . . . is retrieved from the data from Table 1 to Table 4 described hereinbefore (ST 155).

The possible telephone call toll is calculated on the basis of the retrieved telephone call toll data in accordance with the calculation formula shown in Table 5 (ST 156).

The line ranking is determined in order of the low toll from the possible telephone call toll (ST 157), and the determination result is transmitted to the side of the exchange (ST 158).

The process is finished after the determination result is transmitted to the side of the exchange.

<THE PROCESS FOR RETURNING THE TELEPHONE CALL TOLL DATA IN OTHER STATION>

Figure 17:
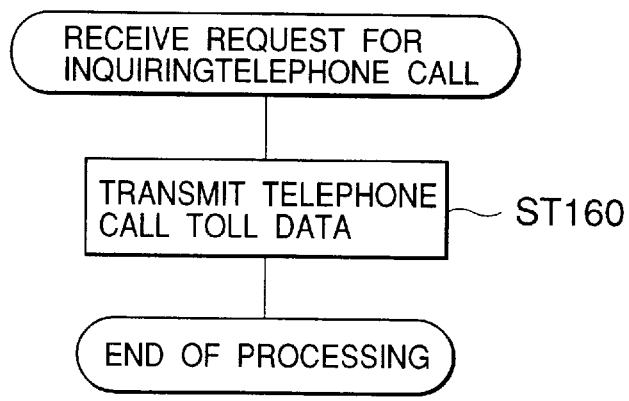
FIG. 17 is a flowchart indicating a process in the embodiment 1 of the present invention.

As shown in FIG. 17, the telephone call toll data is transmitted to other station (ST 160), after receiving the request for inquiring the telephone call toll data from other station (ST 450).

Then, the above-mentioned process is finished after transmitting the telephone call toll data.

<DEFORMED EXAMPLE 1 OF THE EMBODIMENT 1>
[OUTLINE OF THE DEFORMED EXAMPLE 1]

In the deformed example 1, the process of ST 163 is different from the process of the embodiment 1.

[CONTENT OF THE DEFORMED EXAMPLE 1]

The difference between the process in the private network 33 and the process in the embodiment 1 will be described, and the detailed description about the identical content of the process will be omitted by adding the identical Step ST number to them.

In the present deformed example, other station is inquired of the telephone call toll data 110 of other station, and the line whose possible telephone call toll is the lowest is determined with the data of the local station on the basis of the inquired data (ST 164).

Figure 7:
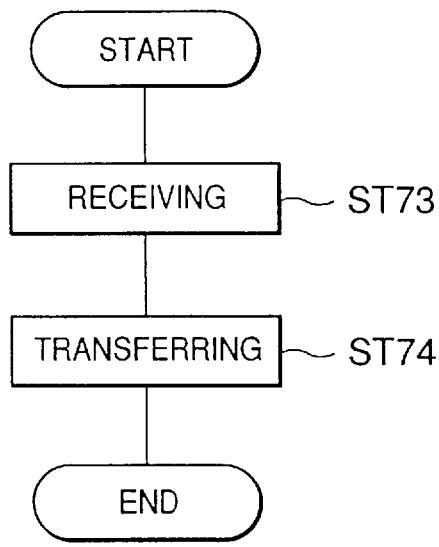
FIG. 7 is a flowchart indicating a process in the embodiment 1 of the present invention.

On the other hand, in other station, as shown in FIG. 7, the request for inquiring the telephone call toll data 110 concerning the lines which can be talked to the specific destination number from the local station A through the analog line, the digital line or ISDN line is received from other stations B and C within the private network 33 (ST 73).

The illustrated data from Table 1 and Table 4 concerning the local station A is transferred to the station which originated the inquiry (ST 74), when the request for inquiring the telephone call toll data 110 is received.

By these actions, the data in each station A, B and C of the private network 33 can be transmitted to other station which originated the inquiring through the analog trunk line, the digital line or ISDN line in a short period of time.

<THE DEFORMED EXAMPLE 2 OF THE EMBODIMENT 2>
[OUTLINE OF THE DEFORMED EXAMPLE 2]

The deformed example 2 is one of the additional processes in each station A, B and C within the private network 33, and all of the data of the update and the local station are transmitted to other station every time the telephone call toll data 100 of the local station is updated.

[CONTENT OF THE DEFORMED EXAMPLE 2]

FIG. 9 is a diagram indicating a flowchart of the process in each station within the private network.

FIG. 9 indicates a process when the designated period has passed since the designated date of the telephone call toll data 110 or when the telephone call toll data of the local station is updated.

At this moment, the designated date and the designated period of the telephone toll data 110 are registered as the data of the local station by the maintenance console of the electronic exchanges 30, 31 and 32 within the private network 33 and so on.

The data of the local station from Table 1 to Table 4 which were indicated previously are transmitted to all of other stations B and C within the private network 33 through the analog trunk line, the digital line and ISDN line (ST 93), when the designated period has passed since the designated date or when the telephone call toll data of the local station is updated.

Then, the above-mentioned process is finished after the data of the local station are transmitted to all of other station B and C within the private network 33.

Figure 10:
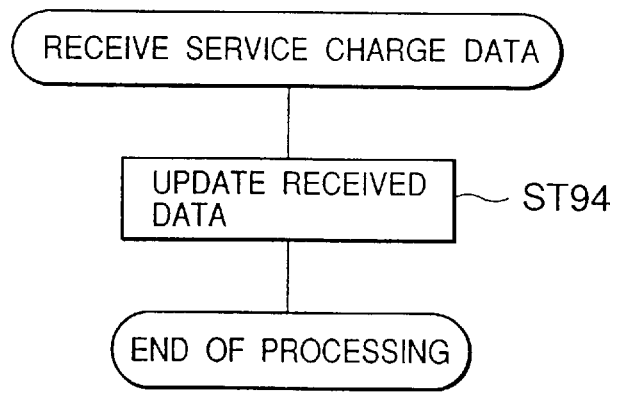
FIG. 10 is a flowchart indicating a process in the embodiment 1 of the present invention.

On the other hand, in other stations B and C, as shown in FIG. 10, the telephone call toll data 110 is received from one station A within the private network 33, and the data received from other station is updated out of the data of the local station from Table 1 to Table 4 which were indicated previously (ST 94).

By these actions, the data received from other station can be updated in each station in a short period of time.

<EMBODIMENT 2>
[OUTLINE OF THE EMBODIMENT 2]

In the embodiment 2, the calculators 55, 60 and 62 are connected to the outside of the electronic exchanges 50, 59 and 61 within the private network respectively, and the process is executed on the basis of the output data outputted from the external calculators 55, 60 and 62 in the electronic exchanges 50, 59 and 61.

The embodiment 2 is different from the embodiment 1 in a point that such processes as arithmetic processing is executed by the external calculators 55, 60 and 62.

[CONTENT OF THE EMBODIMENT 2]

Figure 18:
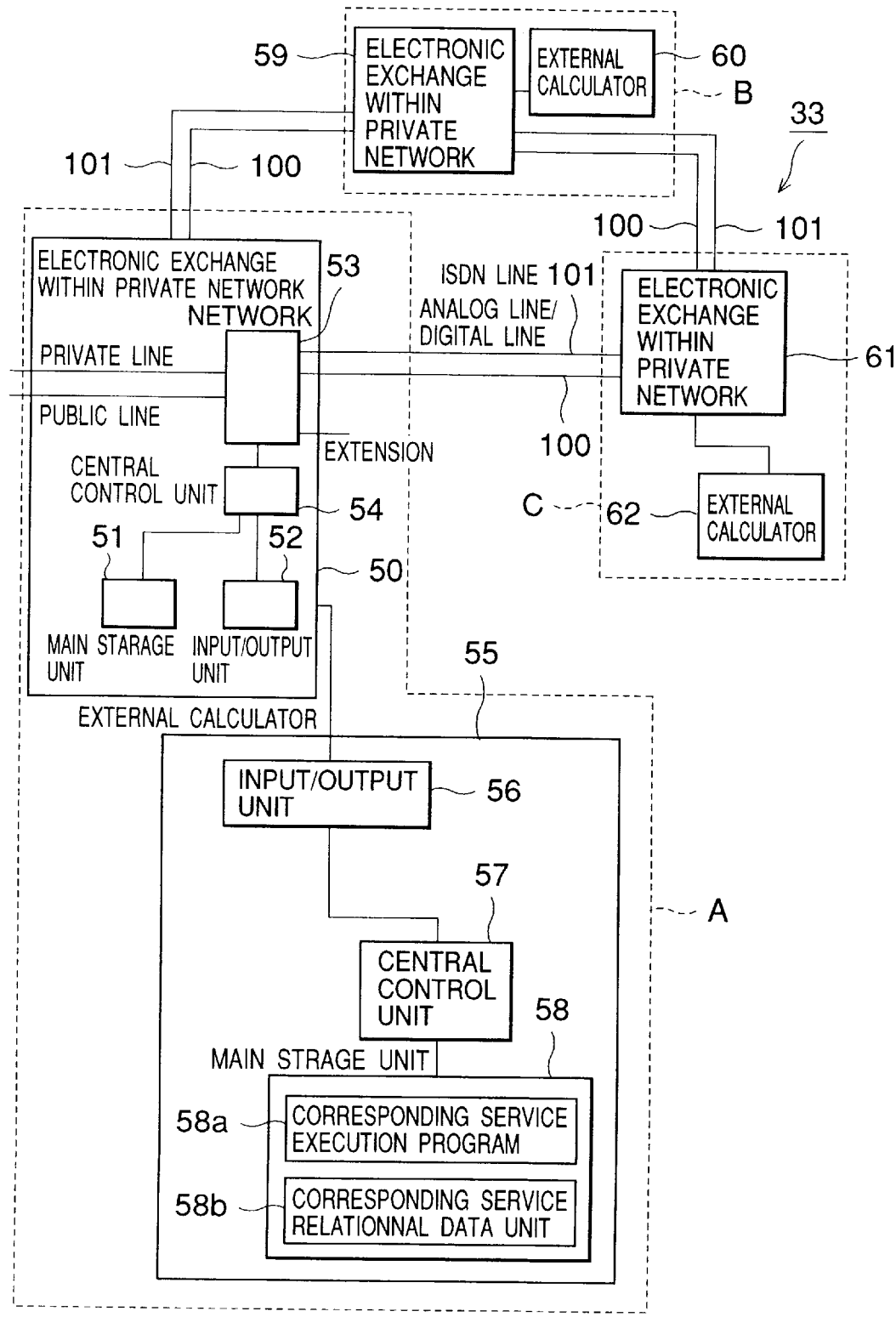
FIG. 18 is a type diagram indicating a construction in the embodiment 2 of the present invention.
Figure 19:
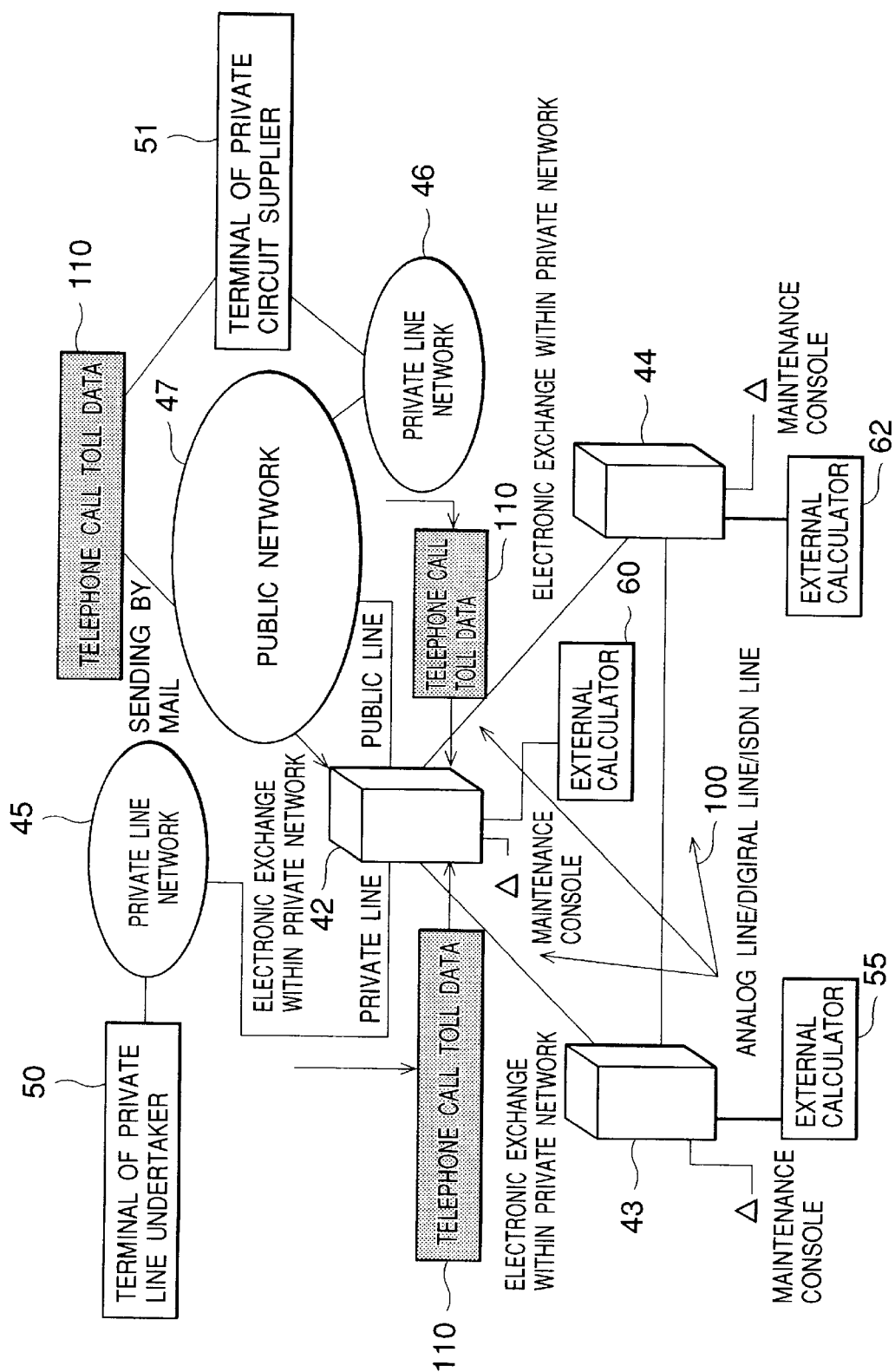
FIG. 19 is a type diagram indicating a network in the embodiment 2 of the present invention.

FIG. 18 is a system block diagram indicating the embodiment 2 of the present invention, and FIG. 19 is a type diagram when the system of FIG. 18 is constructed on the network.

Only the constructions which are different from the system described in FIG. 1 and FIG. 2 will be described in detail.

In the system, the external calculators 55, 60 and 62 are connected to the electronic exchanges 53, 59 and 61 within the private network through the analog trunk line, ISDN line or the digital line respectively.

The electronic exchange 50 within the private network is provided with a main storage unit 51, an input/output unit 52, a network circuit 53 and a central control unit 54.

The constructions of the electronic exchanges 59 and 61 within the private network are the same as the electronic exchange 50 within the private network, so the illustration and the description about them will be omitted.

Besides, the external calculators 55, 60 and 62 are connected to the electronic exchanges 50, 59 and 60 within the private network by a bus line and a signal line.

By the way, in the present embodiment, the external calculator 55 is provided with an input/output unit 56, a central control unit 57 and a main storage unit 58. The data is written into the main storage unit 58 and the data is read out from the main storage unit 58 on the basis of the control command transmitted from the central control unit 57, and an input/output control of the input/output unit 56 is executed by the command transmitted from the central control unit 57.

Besides, the main storage unit 58 is provided with a corresponding service execution program unit 58a for executing the corresponding service and a corresponding service relational data unit 58b for storing the corresponding service relational data.

[THE PROCESS USING THE EXTERNAL CALCULATOR]

Figure 20:
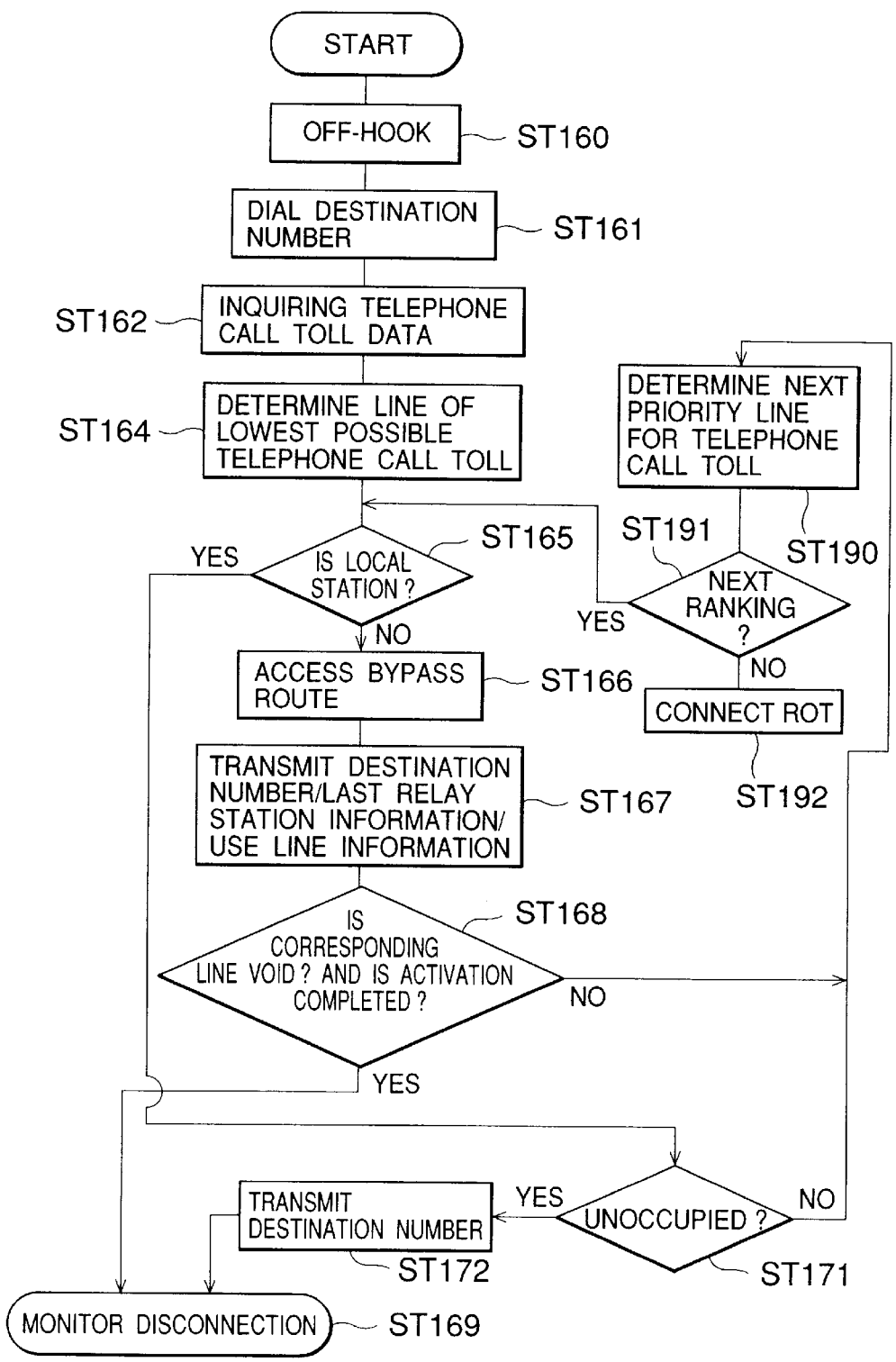
FIG. 20 is a flowchart indicating a process in the embodiment 2 of the present invention.

Then, the process of the telephone call toll data for the external calculators 55, 60 and 62 of each station A, B and C is shown in FIG. 20.

[THE PROCESS FOR THE EXTERNAL CALCULATOR OF EACH STATION OUTSIDE OF THE LOCAL STATION]

The process of ST 163 of FIG. 20 is different from the process of FIG. 3 (ST 162). The calculator of the local station inquires of the calculator of other station or the central station about the telephone call toll data and the determination ranking, and the exchange of the local station also executes the process of ST 166 and ST 172 by the command of the calculator of the local station.

[THE PROCESS IN THE CALCULATOR OF OTHER STATION OR CENTRAL STATION]

In the calculator of other station or the central station, the processes of FIG. 16 or FIG. 17 is executed. Hereupon, the concrete description about them will be omitted.

<EMBODIMENT 3>
[OUTLINE OF THE EMBODIMENT 3]

In the embodiment 3, a method for calculating the telephone call toll according to combination of the lines by the method for selecting and transmitting the optimum route of the present invention is applied to a multifunctional telephone of general household.

[CONTENT OF THE EMBODIMENT 3]

In drawings from FIG. 21 to FIG. 24, the method for calculating the telephone call toll data according to combination of the lines by the method for selecting and transmitting the optimum route of the present invention is applied to the multifunctional telephone of general household.

Figure 21:
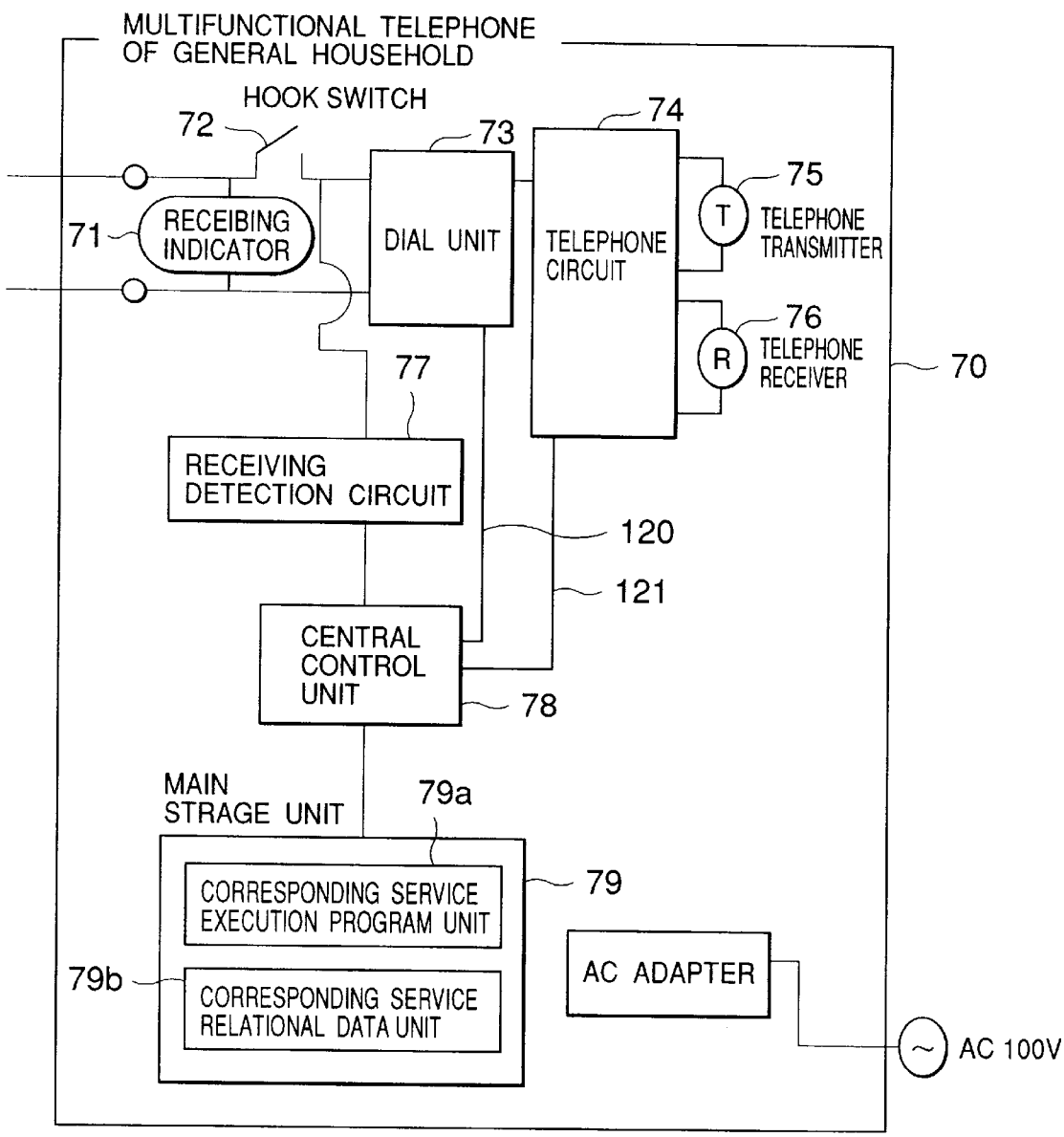
FIG. 21 is a type diagram indicating a construction in the embodiment 3 of the present invention.

FIG. 21 indicates a block diagram of the above-mentioned multifunctional telephone of general household.

The multifunctional telephone is provided with a receiving indicator 71 on the receiving side and a hook switch 72 in which the switch is closed when the telephone is off-hooked.

The switches of a dial unit 73 and a receiving detection circuit 77 are closed to be connected, when the telephone is off-hooked.

On the other hand, a main storage unit 79 is connected to the receiving detection circuit 77 through a central control unit 78.

The main storage unit 79 is provided with a corresponding service execution program unit 79a in which the corresponding service execution program is stored, and a corresponding service relational data unit 79b in which the corresponding service relational data is stored.

The above-mentioned receiving indicator 71 makes it possible to identify the receiving visually by a LED display and a flashing display. The switch of the hook switch 72 is closed when the telephone is off-hooked to transmit the inputted figures to the dial unit 73.

Further, a telephone data is inputted into the central control unit 78 through a data line 120 from a telephone circuit 74, and a control signal is inputted into the telephone circuit 74 through a control line 121 from the central control unit 78.

<THE PROCESS FOR ACCEPTING THE INPUT FOR STARTING THE CALCULATION OF THE TELEPHONE CALL TOLL ACCORDING TO COMBINATION OF THE LINES IN THE MULTIFUNCTIONAL TELEPHONE OF HOUSEHOLD>

Figure 22:
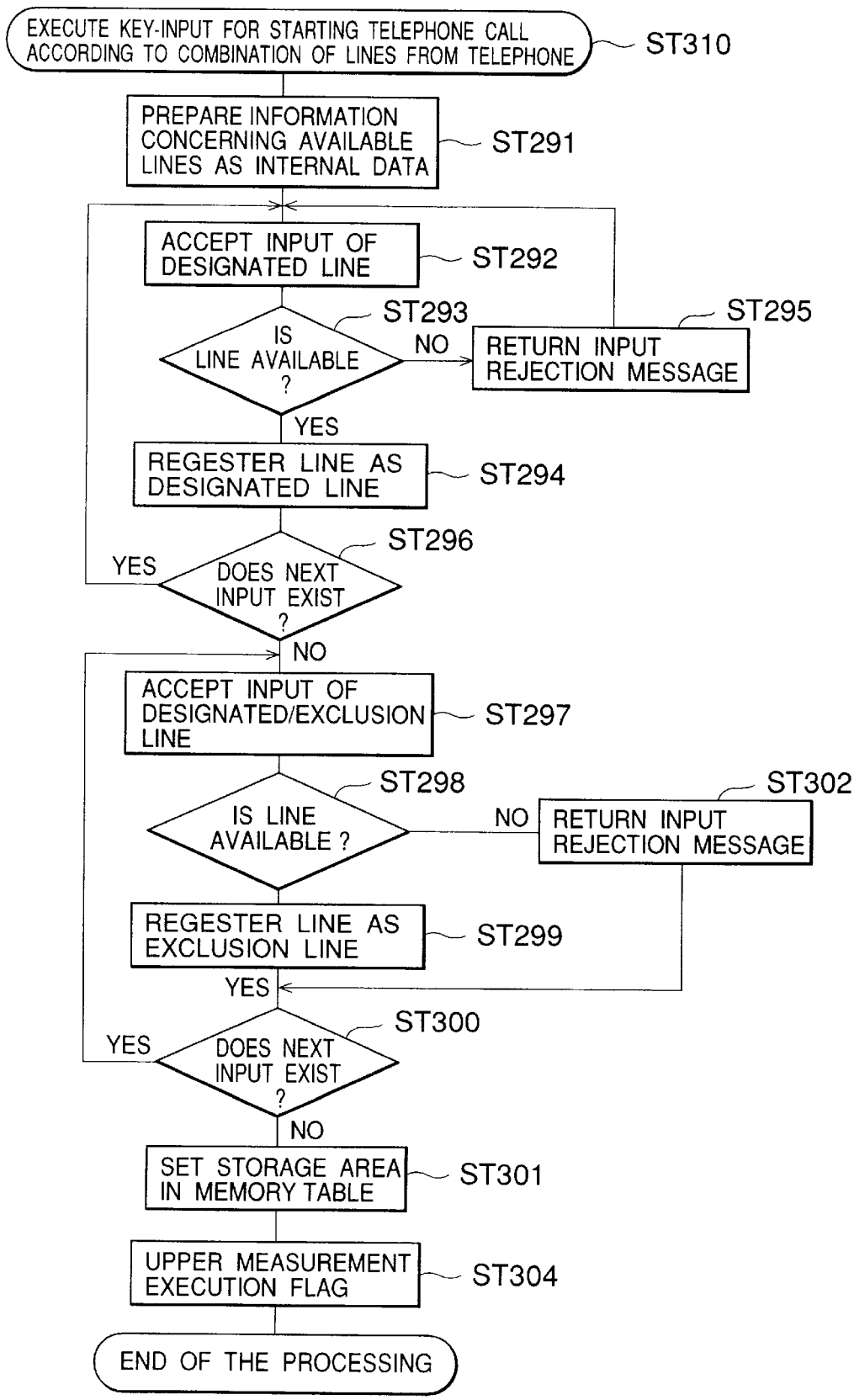
FIG. 22 is a flowchart indicating a process in the embodiment 3 of the present invention.

In FIG. 22, the telephone is off-hooked, and a key-input for starting the calculation of the telephone call toll according to combination of the lines is executed (ST 310).

In the following process, quite the same process as FIG. 11 is executed until the measurement execution flag is raised (ST 316).

In ST 316, the flag for processing the calculation of the toll according to combination in the transmission is raised.
<THE PROCESS FOR ACCEPTING THE INPUT FOR FINISHING THE TELEPHONE CALL TOLL ACCORDING TO COMBINATION OF THE LINES IN THE MULTIFUNCTIONAL TELEPHONE OF HOUSEHOLD>

Figure 23:
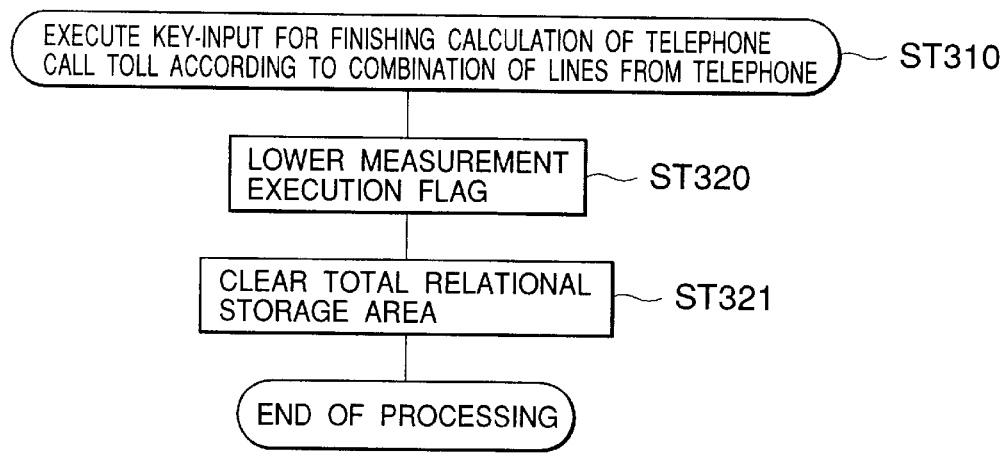
FIG. 23 is a flowchart indicating a process in the embodiment 3 of the present invention.

In FIG. 23, the input for finishing the calculation of the telephone call toll according to combination of the lines is accepted from the telephone (ST 310).

At this moment, the measurement execution flag is lowered and the total relational storage area shown in FIG. 7 is cleared (ST 321). The process is finished after the total relational storage area is cleared.
<THE PROCESS FOR ACCEPTING THE KEY-INPUT FOR OUTPUTTING THE CALCULATION RESULT OF THE TELEPHONE CALL TOLL ACCORDING TO COMBINATION OF THE LINES IN THE MULTIFUNCTIONAL TELEPHONE OF HOUSEHOLD>

Figure 24:
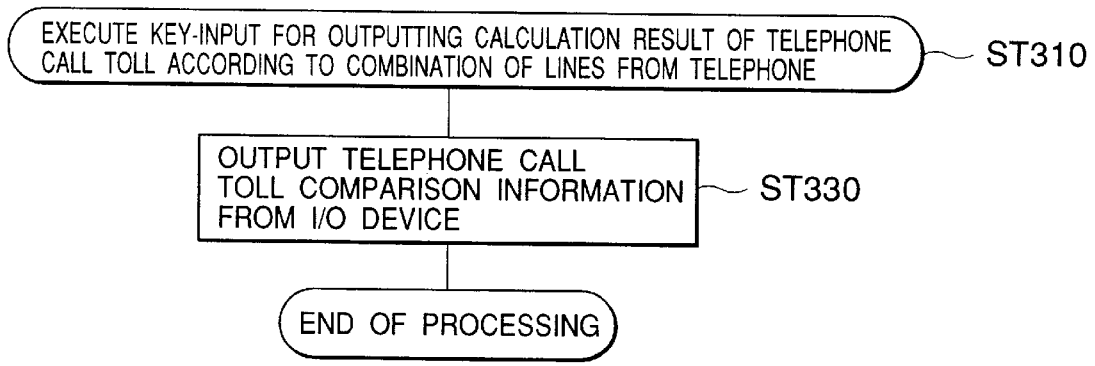
FIG. 24 is a flowchart indicating a process in the embodiment 3 of the present invention.

In FIG. 24, the key-input for outputting the calculation result of the telephone call toll according to combination of the lines is executed from the telephone (ST 310).

At this moment, the calculation result is outputted to a printer and a display device which are I/O devices and so on (ST 330). The process is finished after the calculation result is outputted to the printer, the display device and so on.
<THE DEFORMED EXAMPLE 1 OF THE EMBODIMENTS FROM 1 TO 3>
[OUTLINE OF THE DEFORMED EMBODIMENT 1]

In the present deformed embodiment 1, as shown in Claims 10, 11, 22 and 23, the possible telephone call quantity by the end of the month is allocated according to route or according to destination so that the total telephone call toll by the end of the month will be the lowest, and the line selection in the transmission of LCR [ARS/AAR] is executed on the basis of the allocated quantity.

[CONTENT OF THE DEFORMED EMBODIMENT 1]

Figure 25:
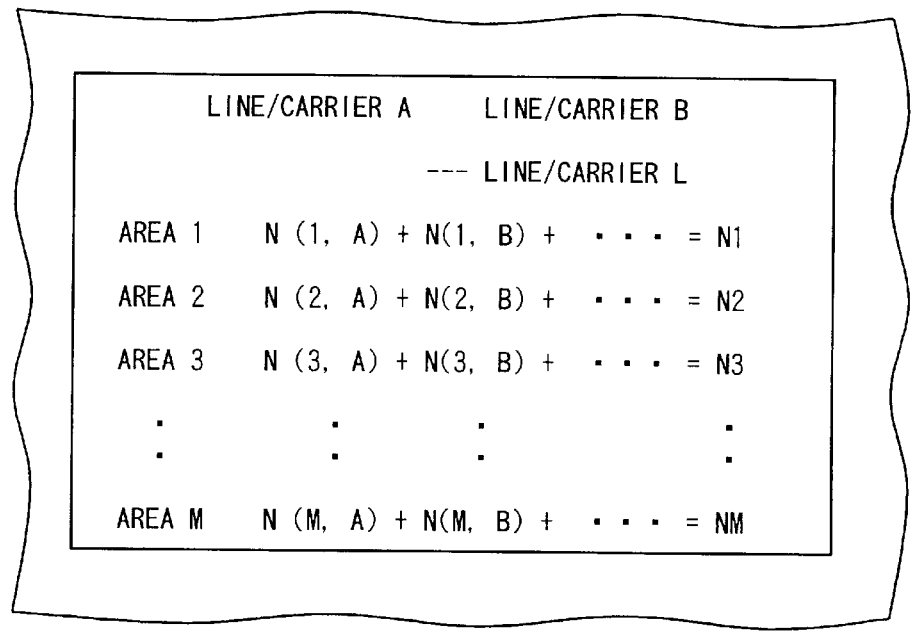
FIG. 25 is a type diagram for describing the deformed embodiment 1 applied to the embodiments from 1 to 3 of the present invention.

As shown in FIG. 25, the telephone call time/the number of times of telephone call are allocated into the areas from area 1 to M, the lines and the carriers from A to L by using the formula.

The formula is used when the operation is executed in the central control unit 37 show in FIG. 1 in the embodiment 1, the central control unit 57 within the external calculator 55 shown in FIG. 25 in the embodiment 2, and the central control unit 78 of the multifunctional telephone of general household 70 shown in FIG. 21 in the embodiment 3.

For instance, it is possible to allocate the possible total telephone call time or the possible total number of times of telephone call by the end of the month in the area X into all of the lines which can be used in the area X or into the telephone call time or the number of times of telephone call N (X, Y) of carrier Y by using the formula shown in FIG. 25.

Figure 26:
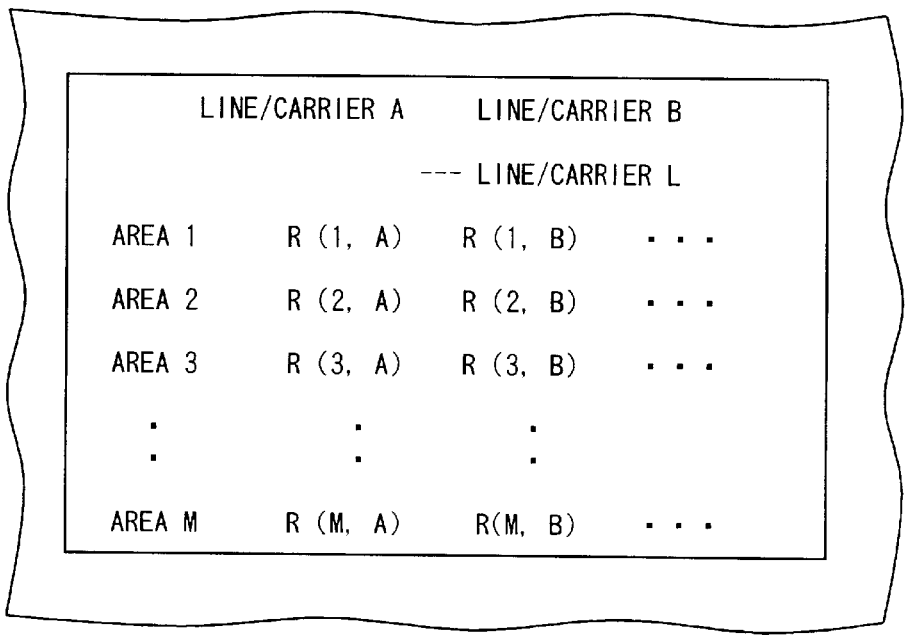
FIG. 26 is a type diagram for describing the deformed embodiment 2 applied to the embodiments from 1 to 3 of the present invention.
Figure 27:
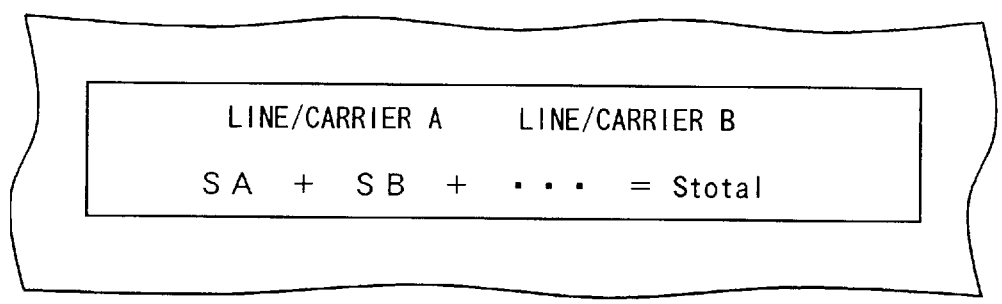
FIG. 27 is a type diagram for describing the deformed embodiment 2 applied to the embodiments from 1 to 3 of the present invention.

Then, the accounting toll rate information R (X, Y) according to route and according to destination shown in FIG. 26 is used to calculate the total accounting tolls by the end of the month between SA and SL according to line and carriers between A and L from the allocation N (X, Y) of the telephone call quantity according to route or according to destination by summing up the product and the areas, and regard the sum total as $S_{TOTAL}$.

The total allocation N (X,Y) of the telephone call quantity according to route or according to destination which minimizes the $S_{TOTAL}$ is obtained. The selection of the lines is executed when LCR [ARS/AAR] is transmitted in accordance with the allocated quantity.

FIG. 28 and FIG. 29 is one of the accounting toll rate informations shown in FIG. 26, and in case of FIG. 28, the fixed telephone call toll is imposed up to one telephone call time/one number of times of telephone call and the telephone call toll is raised when the telephone call time/the number of times of telephone call are surpassed.

Besides, in case of FIG. 29, the telephone call toll is raised up to one telephone call time/one number of times of telephone call d.

In the above-mentioned telephone call toll characteristic, the telephone call toll is lowered at a fixed rate (c–e), when the telephone call time/the number of times of telephone call are equal to or more than f.

Besides, the telephone call toll is raised for the second time, when the telephone call time/the number of times of telephone call are more than f and less than j.

The telephone call toll is lowered only (g–i) for the second time at the fixed rate.

In the present deformed embodiment, it is possible to lower the total telephone call toll of a monthly amount to the maximum extent, for instance, by calculating the possible telephone call quantity of one month according to route or according to destination at a small period, even if the line and the carrier having an accounting system shown in FIG. 28 and FIG. 29 exist.

What is claimed is:

1. A method for selecting and transmitting a route in a private network system having a function of selecting an optimum route in a station line transmission of each electronic exchange and a function of selecting an optimum line in a trunk line transmission among the electronic exchanges, comprising the steps of;

loading a telephone call toll data of public network including a line network provided by a undertaker who provides private telephone lines of every kind in an installation position of each electronic exchange;

selecting the optimum route or the line by an optimum route selection means or optimum line selection means for selecting an optimum route or a line from the private network on the basis of the telephone call toll data of the public network; and executing the transmission selectively through the route or line selected by said selection step.

2. A method for selecting and transmitting an optimum route according to claim 1, comprising the steps of:

comparing the toll of each route of the combinations, when a user of the electronic exchange executes a station line transmission through the electronic exchange that will be a local station or a relay station by combining routes which can be contracted;

determining the optimum route or the line of the combinations in accordance with said toll comparison step; and calculating a virtual toll for every combination of the lines which can be contracted in accordance with the determined result.

3. A method for selecting and transmitting an optimum route according to claim 2, comprising the steps of:

collecting quality information obtained when a line is cut of each of the route or lines;

statistically processing the quality information;

classifying a quality of the line based on the statistical value;

securing a constant quality according to the allocated class;

determining a line group in response to a subscriber class of a person who transmits; and selecting a route or a bypass of the optimum line from the determined line group.

4. A method for selecting and transmitting an optimum route according to claim 2, comprising the steps of:

actuating the exchange by a selection actuation command outputted from a calculator outside of the exchange; and selecting and transmitting a route or a line when a station line is transmitted from the private network.

5. A method for selecting and transmitting an optimum route according to claim 4, comprising the steps of:

transmitting and receiving the telephone call toll data of the public network necessary for actuating the exchange among the calculators outside of the exchange of each station; and calculating a possible telephone call toll before talking over the telephone to select an optimum route or a line.

6. A method for selecting and transmitting an optimum route according to claim 2, comprising the steps of:

comparing the toll of each route of the combinations in transmission of the station line by combining the lines which can be contracted to determine the optimum route of the each combination within a household telephone by operation; and calculating a virtual toll for every combination of the lines which can be contracted within the household telephone by operation in accordance with the result determined in said route determination step.

7. A method for selecting and transmitting an optimum route in a private network system having a function of selecting an optimum route in a station line transmission of each electronic exchange and a function of selecting an optimum line in a trunk line transmission of each electronic exchange, comprising the steps of:

loading telephone call toll data of a public network including a line network provided by an undertaker who provides private telephone lines of every kind in an installation position of each electronic exchange;

selecting the optimum route or the line by said optimum route selection means or optimum line selection means for selecting an optimum route or a line from the private network on the basis of the telephone call toll data of the public network;

executing the transmission selectively through the route line selected by said selection step;

comparing the toll of each route of the combinations, when a user of one electronic exchange executes a station line transmission through the electronic exchange that will be a local station or a relay station by combining routes which can be contracted;

determining the optimum route or the line of the combinations in accordance with said toll comparison step;

calculating a virtual toll for every combination of the lines which can be contracted in accordance with the determined result;

comparing the toll of each route of the combinations in transmission of the station line by combining the lines which can be contracted to determine the optimum route of the each combination within a household telephone by operation;

calculating a virtual toll for every combination of the lines which can be contracted within the household telephone by operation in accordance with the result determined in said route determination step;

predicting a possible telephone call quality for each route of one month according to the destination from the past use information of the each route;

reallocating the telephone call quality according to the route and according to the destination so that the total telephone call toll of one month will be the lowest; and selecting a route or a line in accordance with the reallocated telephone call quality.

8. A method for selecting and transmitting an optimum route according to claim 7, including a step of:

reallocating the possible telephone call quantity according to route or according to destination so that the total telephone call toll of one month will be the lowest, even if a route having a rate system in which the fixed telephone call toll is imposed up to a certain telephone call toll/a number of times of telephone call and the telephone call toll is raised when the telephone call time/the number of times of telephone call are surpassed is included.

9. A method for selecting and selecting an optimum route according to claim 7, including a step of:

reallocating the possible telephone call quantity according to route or according to destination so that the total telephone call toll will be the lowest, even if a route having a rate system in which the telephone call toll is raised at a fixed discount rate up to the fixed telephone call time/the number of times of telephone call and the discount rate is changed when the predetermined telephone call time/the number of times of telephone call are surpassed is included.

10. A method for selecting and transmitting an optimum route according to claim 9, comprising the steps of:

determining a ranking of the optimum routes for every fixed period from the telephone call toll data of the public network to store the information; and selecting the optimum route from a void optimum line on the basis of the ranking information to transmit the public network.

11. A system for selecting and transmitting an optimum route in a private network system having a function of selecting an optimum route in a station line transmission of each electronic exchange and a function of selecting an optimum line in a trunk line transmission among the electronic exchanges, comprising:

optimum route selection means and optimum line selection means for selecting an optimum route and a line from a private network on the basis of a telephone call toll data of a public network including a line network provided by a undertaker who provides a private telephone lines of every kind in an installation position of each electronic exchange; and transmission means for executing a transmission selectively through the optimum route or the optimum line selected by said optimum route selection means and said optimum line selection means.

12. A system for selecting and transmitting an optimum route according to claim 11, comprising:

toll comparison means for comparing the toll of each route within the combinations, when a user of the electronic exchange transmits the station line through the electronic exchange which will be a local station or a relay station by combining the routes which can be contracted;

determination means for comparing an optimum route or an optimum line from the comparison result of the toll by said toll comparison means to determine the optimum route or the optimum line; and virtual toll calculation means for calculating a virtual toll for every combination of the lines which can be contracted in accordance with the determined result by said determination means.

13. A system for selecting and transmitting an optimum route according to claim 11, comprising:

quality information collecting means for collecting quality information obtained when a line is cut of each route or the line;

statistically processing means for statistically processing the quality information;

classifying means for classifying a quality of the line based on the statical value;

securing means for securing a constant quality according to the allocated class;

line group determination means for determining a line group; and specific line group selection means for selecting a route or a bypass of the optimum line out of the line group determined in said line group determination means.

14. A system for selecting and transmitting an optimum route according to claim 11, including:

selection transmitting means for actuating the exchange by the selection actuation command outputted from the calculator outside of the exchange to select and transmit a route or a line when the station line is transmitted from the private network.

15. A system for selecting and transmitting an optimum route according to claim 14, comprising:

transmitting/receiving means for transmitting and receiving the telephone call toll data of the public network necessary for actuating the each exchange among the calculators outside of the exchanges of each station; and possible telephone call toll calculation/line selection means for calculating a possible telephone call toll before talking over the telephone on the basis of the telephone call toll data received in said transmitting/receiving means to select an optimum route or an optimum line.

16. A system for selecting and transmitting an optimum route according to claim 12, comprising:

comparison/determination means for comparing the toll of each route of the combinations in transmission of the station line by the combining the lines which can be contracted to determine the optimum route of the each combination within the household telephone by operation; and virtual toll calculation means for calculating a virtual toll for every combination of the lines which can be contracted within the household telephone by operation in accordance with the result determined in said comparison/determination means.

17. A system for selecting and transmitting an optimum route in a private network system having a function of selecting an optimum route in a station line transmission of each electronic exchange and a function of selecting an optimum line in a trunk line transmission each electronic exchange, comprising:

optimum route selection means and optimum line selection means for selecting an optimum route and a line from a private network on the basis of a telephone call toll data of a public network including a line network provided by an undertaker who provides private telephone lines of every kind in an installation position of each electronic exchange;

transmission means for executing a transmission selectively through the optimum route or the optimum line selected by said optimum route selection means and said optimum line selection means;

possible telephone quantity guessing means for guessing a possible telephone call quantity of one month according to each route and according to the destination from the past use information of each route;

allocation means for allocating the possible telephone call quantity guessed in said possible telephone call quantity guessing means according to the route and according to the destination so that the total telephone call toll of one month will be the lowest; and selection means for selecting a route or a line in accordance with the telephone call quality allocated in said allocation means.

18. A system for selecting and transmitting an optimum route according to claim 17, including:

first possible telephone call quantity reallocation means for reallocating the possible telephone call quantity according to the route and according to the destination so that the total telephone call toll of one month will be the lowest, even if a route having a rate system in which a fixed telephone call toll is imposed until the telephone call toll/the number of times of telephone call reaches one fixed telephone call toll/number of times of telephone call and the telephone call toll is raised when the telephone call time/the number of times of telephone call are surpassed is included.

19. A system for selecting and transmitting an optimum route according to claim 17, including:

second possible telephone call quantity reallocation means for reallocating the possible telephone call quantity according to route and according to destination so that the total telephone call toll of one month will be the lowest, even if a route having a rate system in which the telephone call toll is raised at a fixed discount rate until the telephone call toll/the number of times of telephone call reaches one fixed telephone call toll/number of times of telephone call and the discount rate is changed for the second time when the fixed telephone call time/the number of times of telephone call are surpassed is included.

20. A system for selecting and transmitting an optimum route according to claim 11, comprising:

determination/storage means for determining the ranking of the optimum route from the telephone call toll data of the public network per fixed period to store the information; and optimum route transmission means for selecting the optimum route from a void optimum line on the basis of the ranking information of the optimum route which was determined and stored in said determination/storage means to transmit the public network.

21. A private switching station connected to another private switching station via a trunk, receiving a request for a trunk calling from a terminal accepted in the private switching station, determining an optimum private switching station executing the trunk calling, and determining a route of the trunk calling, said private switching station comprising:

storing means for storing, in addition to telephone toll data of a line capable of being used by a local station, another telephone toll data of a line capable of being used by at least one of other switching stations connected through trunks;

determining means for analyzing destination information of the trunk calling in accordance with the request for the trunk calling from the terminal accepted in the private switching station and for determining an optimum private switching station for the trunk calling based on the telephone toll data of each of the private switching stations; and executing means for executing the trunk calling from the optimum private switching station determined by the determining means.

22. A private switching station connected to another private switching station via a trunk, receiving a request for a trunk calling from a terminal accepted in the private switching station, determining an optimum private switching station executing the trunk calling, and determining a route of the trunk calling, said private switching station comprising:

interface means for storing telephone toll data of a line capable of being used by other switching stations and for establishing an interface for an optimum route determining unit determining an optimum private switching station for the trunk calling;

request means for giving calling information of the trunk calling and a request of inquiry to the optimum route determining unit; and executing means for executing the trunk calling from the optimum private switching station based on a result by the optimum route determining unit.

* * * * *